United States Patent
Coulbeck et al.

(10) Patent No.: US 9,718,984 B2
(45) Date of Patent: Aug. 1, 2017

(54) MULTI-ACID MULTI-BASE GRAFT COPOLYMER DISPERSANTS

(71) Applicant: Lubrizol Advanced Materials, Inc., Cleveland, OH (US)

(72) Inventors: Elliot Coulbeck, Bury (GB); John D. Schofield, Bury (GB); Patrick J. Sunderland, Rossendale (GB); Dean Thetford, Norden (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/916,628

(22) PCT Filed: Sep. 5, 2014

(86) PCT No.: PCT/US2014/054182
§ 371 (c)(1),
(2) Date: Mar. 4, 2016

(87) PCT Pub. No.: WO2015/035107
PCT Pub. Date: Mar. 12, 2015

(65) Prior Publication Data
US 2016/0215160 A1 Jul. 28, 2016

Related U.S. Application Data

(60) Provisional application No. 61/874,384, filed on Sep. 6, 2013.

(51) Int. Cl.
| | | |
|---|---|---|
| *C09D 133/02* | (2006.01) | |
| *C09D 133/14* | (2006.01) | |
| *C09D 133/24* | (2006.01) | |
| *B01F 17/00* | (2006.01) | |
| *C09B 67/46* | (2006.01) | |
| *C09D 7/02* | (2006.01) | |
| *C09D 11/03* | (2014.01) | |

(52) U.S. Cl.
CPC .......... *C09D 133/02* (2013.01); *B01F 17/005* (2013.01); *C09B 67/009* (2013.01); *C09D 7/02* (2013.01); *C09D 11/03* (2013.01)

(58) Field of Classification Search
CPC .......... C08F 20/08; C08F 20/36; C08F 20/58; C08F 20/60
See application file for complete search history.

(56) References Cited

U.S. PATENT DOCUMENTS

| | | |
|---|---|---|
| 4,224,212 A | 9/1980 | Topham et al. |
| 4,861,380 A | 8/1989 | Campbell et al. |
| 5,700,395 A | 12/1997 | Thetford et al. |
| 6,111,054 A | 8/2000 | Haubennestel et al. |
| 6,197,877 B1 | 3/2001 | Thetford et al. |
| 7,767,750 B2 | 8/2010 | Thetford et al. |
| 2006/0183815 A1 | 8/2006 | Alzer et al. |
| 2008/0202382 A1* | 8/2008 | Carlblom ............ B01F 17/0007 106/236 |
| 2010/0280183 A1* | 11/2010 | Kou ...................... B01F 17/005 525/218 |
| 2012/0029104 A1 | 2/2012 | Nagelsdiek et al. |
| 2013/0018121 A1 | 1/2013 | Nagelsdiek et al. |
| 2013/0041082 A1* | 2/2013 | Sunderland ......... B01F 17/0028 524/219 |

FOREIGN PATENT DOCUMENTS

| | | |
|---|---|---|
| WO | 2007060070 A1 | 5/2007 |
| WO | 2011139580 A2 | 11/2011 |
| WO | 2012125609 A1 | 9/2012 |
| WO | 2013063199 A1 | 5/2013 |

OTHER PUBLICATIONS

J. Wamat, N. Marcotte, J. Reboul, G. Layrac, A. Aqil, C. Jerome, D.A. Lerner and C. Geradin, et al. 2012. "Physicochemical properties of PH-controlled polyion complex (PIC) micelles of poly(acrylic acid)-based double hydrophilic block copolymers and various polyamines" in Analytical and Bioanalytical Chemistry, 403(5), p. 139-1404. (Wamat et al. 2012).

\* cited by examiner

*Primary Examiner* — Vu A Nguyen
(74) *Attorney, Agent, or Firm* — Samuel B. Laferty; Teresan W. Gilbert

(57) ABSTRACT

A composition comprising particulate solid, an organic medium and a dispersant comprising a polyacrylic copolymer functionalized with a polyether and reacted with an aminic polybasic species.

12 Claims, No Drawings

MULTI-ACID MULTI-BASE GRAFT COPOLYMER DISPERSANTS

FIELD OF THE INVENTION

The disclosed technology relates to dispersants from polyether functionalized polyacid reacted with an aminic polybasic species. The polyacids are primarily of the carboxylic type. The invention further relates to the use of the polycarboxylic copolymer, functionalized with specific polyethers, reacted with an aminic polybasic species as a dispersant for particulates in organic solvents and/or polymers.

BACKGROUND OF THE INVENTION

Prior art patents describe polyethyleneimine reacted with polyester chains. These include U.S. Pat. No. 4,224,212 which describes a polyester with hydroxystearic acid or ricinoleic acid repeat units. U.S. Pat. No. 5,700,395 describes a polyester with caprolactone, hydroxystearic acid and/or ricinoleic acid repeat units. U.S. Pat. No. 4,861,380 describes a polyester from caprolactone. U.S. Pat. No. 6,197,877 describes a polyester from both caprolactone and valerolactone.

U.S. Pat. No. 7,767,750 describes a composition of a particulate solid, an organic media or water, and a compound that is the residue of a polyamine or polyimine, a dibasic acid, and an amine terminated poly(alkylenoxy).

WO2007/060070 and US2006/0183815 discloses amine-functional polymers reacted with one or more polyester polymeric chains in combination with one or more polyether chains, which has an amine reactive group, such as phosphate or carboxylate functionality, to make a dispersant.

U.S. Pat. No. 6,111,054 discloses a dispersing agent obtained by salt formation of an amine functional compound with an acid compound and more specifically combining a polyamine with at least three amino groups with a compound containing a phosphoric acid group, a sulphuric or sulphonic acid group in which the acid groups were attached to radicals by an ester functionality and the radicals were made up of polyester, polyether or polyurethanes or mixtures thereof.

WO2011/139580 published November 2011 relates to a (meth)acrylic polymer functionalized with poly(alkyleneoxy) segments used as a dispersant. WO2012/125609 published March 2012 relates to a polymer from polymerizing a mono-vinyl monomer with one or more carboxylic acid groups to form a polymer and reacting that polymer with a primary hydrocarbylamine and a poly(oxyalkylene) primary amine.

"Physicochemical properties of pH-controlled polyion complex (PIC) micelles of poly(acrylic acid)-based double hydrophilic block copolymers and various polyamines" in Analytical and Bioanalytical Chemistry (year 2012), 403(5), page 1395-1404, by J. Warnat, N. Marcotte, J. Reboul, G. Layrac, A. Aqil, C. Jerome, D. A. Lerner and C. Gerardin; discusses polymers of poly(acrylic acid)-b-poly(acrylate methoxy poly(ethylene oxide)) with linear poly(ethylene imine) hydrochloride.

US2013/0018121 and US2012/0029104 are patent publications to Byk Chemie.

SUMMARY OF THE INVENTION

A dispersion comprising a dispersed particulate solid (typically a pigment or filler), an organic continuous medium (typically the organic medium may be a plastics material or an organic liquid) and a surface active reaction product of a polyether functionalized polyacid reacted with a aminic polybasic species, wherein the polyacid species comprises 10 to 500 repeat units, said polyacid comprising at least two free acid groups selected from the types consisting of a carboxylic acid, anhydride of a dicarboxylic acid, acids from sulfur or phosphorus, and salts thereof, and said repeat unit being derived from free-radically polymerizing monomers that had contained a polymerizable carbon-to-carbon double bond and said acid group, free acid groups will mean acid groups are in a form available to react with amine groups of the aminic polybasic species, wherein said polyacid is functionalized with two or more polyether segments via ester, amide, and/or imide linkages between said carbonyl group of the polyacid species and an oxygen or aminic group of the polyether segment, wherein said two or more polyether segments comprise a polyether segment of the Q' type having the formula -J-($C_\delta H_{2\delta}$—O)$_T$—(CH$_2$CH$_2$O)$_X$—R$_2$ wherein δ is 3 and/or 4, -J- is —O—, —N(H)—, or >N—, $_T$ is from 4 to 45 total propylene oxide and/or butylene oxide repeat units and $_X$ is up to 45 repeat units of ethylene oxide per segment, and R$_2$ is a hydrocarbyl group with up to 36 carbon atoms, $_{T+X}$ must equal or be greater than 8 and in one embodiment when ratio of $_{X:T}$ after rounding to two places past the decimal is less than 1.50:1 and more desirably less than 1.40:1, and/or a polyether segment of G' having the formula -J-($C_\delta H_{2\delta}$—O)$_L$—(CH$_2$CH$_2$O)$_M$—R$_1$, where δ is 3 and/or 4, -J- is —O—, —N(H)—, or >N—, $_M$ is from 3 to 60 ethylene oxide units and $_L$ is up to 20 total propylene oxide and/or butylene oxide units per segment, and R$_1$ is a hydrocarbyl group with up to 36 carbon atoms, $_M$ must be greater than $_L$, and in one embodiment the ratio of $_{M:L}$ after rounding to two places past the decimal is at least 1.50:1 or more desirably at least 2.00:1, wherein the number ratio of total acid groups in the polyacid to carbonyl in the polyacid in the form of an ester, amide or imide type functionalized with G' type polyether segments to carbonyl in the polyacid in the form of an ester, amide, or imide type functionalized with Q' type polyether segments is from 20-90:0-35:5-80 (polyacid:G':Q') with the provision that the Q' is further defined as the sum of variables Q$_a$'+Q$_b$' where Q$_a$' is the portion of Q' where J is —N(H)— or >N— [e.g. —C(=O)—N(H)—($C_\delta H_{2\delta}$—O)$_T$—(CH$_2$CH$_2$O)$_X$—R$_2$] and Q$_b$' is the portion of Q' where J is —O— [e.g. —C(=O)—O—($C_\delta H_{2\delta}$—O)$_T$—(CH$_2$CH$_2$O)$_X$—R$_2$] with the provisions that a) the sum of G'+Qa' must together total at least 2.5 more desirably 5, [such that G' could be about 0, 1, 2, 3, 4 or 5 and Q$_a$' would be the complementary amount (e.g. at least 5, 4, 3, 2, 1 or 0) to sum at least 5] and b) the sum of Q$_a$'+Q$_b$'+G' must be at least 10;

wherein said aminic polybasic species comprises a polyamine such as a type that may be linear or branched having a molecular weight from about 140 to 100,000 g/mole; polyvinylamine, alkylenepolyamine, polyallylamine and/or C$_{2-6}$-alkyleneimine, are preferred; and poly(C$_{2-6}$-alkyleneimines) and polyethyleneimine are most preferred; and wherein said aminic polybasic species comprises at least four primary and/or secondary amine groups per molecule;

wherein said reaction product includes two or more ionic and/or covalent bonds between said polyether functionalized polyacid and said aminic polybasic species and the weight ratio of the polyether functionalized polyacid to the aminic polybasic species is from 1:1 to 35:1 and more desirably from 1:1 to 30:1, and preferably 2:1 to 30:1.

A polymeric dispersant is described comprising a polyether functionalized polyacid reacted with an aminic polybasic species. The polyether functionalized polyacid comprises (at least 45 mole %, more desirably at least 50 mole %, and more preferably at least 80 or 95, 98 or 99 mole %) of repeat units [percent is ($\Sigma_x \times 100)/\Sigma$] from free radically polymerizable unsaturated monomers with one or more carboxylic acid group (such as acrylic, methacrylic, maleic, fumaric, itaconic, mesaconic, or citraconic acids) of the structure —CH(A)-C(D)(B)—; optionally up to 50 mole % of repeat units derived from unsaturated monomers containing sulfur or phosphorus based acids, and optionally up to 5, 2, or 1 mole percent of repeat units of other free radically copolymerizable monomers other than those derived from monomers having carboxylic acid or sulfur or phosphorus based acid, $\Sigma$ represents the average number of repeat units in the polyacid, $\Sigma_x$ is the total number of repeat units of the acid, ester, amide, or imide type of the formula [CH(A)-C(D)(B)] below, and $\Sigma_y$ is the number of non-acid repeat units (units not of the formula [CH(A)-C(D)(B)]); $\Sigma_e$ is the number of repeat units from $\Sigma_x$ in the free acid or salt form, i.e. not esterified, amidized, or imidized with Q or G, $\Sigma_q$ is the number of repeat units esterified, amidized or imidized with Q, and $\Sigma_g$ is the number of repeat units esterified, amidized, or imidized with G. $\Sigma_g + \Sigma_q + \Sigma_e$ equals $\Sigma_x$;

wherein the polyether functionalized polyacid in one embodiment comprises at least 95, 98 or 99 weight percent of repeat units of formula

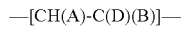

—[CH(A)-C(D)(B)]— wherein:

A is H, —C(═O)— when an nearby J is —N<, or B or mixtures thereof;

B is independently E, G, or Q;

E is —CO$_2$H, —W—P(═O)—(OH)$_\epsilon$ where $_\epsilon$ is 1 or 2, or —W—S(═O)$_2$—OH where W independently in each repeat unit is a) a direct link between a backbone carbon atom and the phosphorus or sulfur atom, b) a hydrocarbylene linking group of either 1-7 carbon atoms defined to optionally including ether, ester, or amide linking groups and/or hydroxyl pendant groups, or c) a poly(C$_{2-4}$-alkyleneoxide) of up to 7 repeat units and optionally including an ether, ester, or amide linking group;

when A is H; D is independently in each repeat unit Y or Z; Y is H or CH$_3$; and Z is —CH$_2$—C(═O)—OH, —CH$_2$-G, or —CH$_2$-Q;

desirably when A is —C(═O)—OH; D is Y; Y is independently in each repeat unit H or CH$_3$; E is only —C(═O)—OH and can't be a phosphorus or sulfur containing acid;

G is CO-J-(C$_\delta$H$_{2\delta}$—O)$_L$—(CH$_2$CH$_2$O)$_M$—R$_1$, where δ is 3 and/or 4, the repeat units (C$_\delta$H$_{2\delta}$—O) and (CH$_2$CH$_2$O) may be in a random or block arrangement: G' is G without the —CO— group (the polyether reactant without the —CO— group of the carboxylic acid) or -J-(C$_\delta$H$_{2\delta}$—O)$_L$—(CH$_2$CH$_2$O)$_M$—R$_1$;

J is —O—, >N— when an adjacent A or B is a —C(═O)—OH or D is —CH$_2$—C(═O)—OH, or —N(H)—. For the avoidance of doubt when we define in the specification or claims A, B, and D such that A or B is or D includes —C(═O)—OH, we mean that these components A and B are or in the case of D can include each of the acid form, ionized form, or the —C(═O)— form if the carbonyl is linked to a nearby nitrogen atom;

$_L$ is 0-20, desirably 0-5;

$_M$ is 3-60, desirably 5-25;

$_M$ must be greater than $_L$, and in one embodiment the ratio of $_{M:L}$ after rounding to two places past the decimal is at least 1.50:1 or more desirably at least 2.00:1:

R$_1$ is a C$_1$-C$_{36}$ hydrocarbyl group, desirably a C$_1$-C$_{18}$, more desirably a C$_1$-C$_7$ hydrocarbyl group that can be a cyclic, branched or non-branched alkyl, aryl, alkylaryl, or arylalkyl;

Q is CO-J-(C$_\delta$H$_{2\delta}$—O)$_T$—(CH$_2$CH$_2$O)$_X$—R$_2$, δ is 3 and/or 4, the repeat units (C$_\delta$H$_{2\delta}$—O) and (CH$_2$CH$_2$O) may be in a random or block arrangement. Q' is the Q group without the —CO— group (the polyether reactant without the —CO— group of the carboxylic acid) or -J-(C$_\delta$H$_{2\delta}$—O)$_T$—(CH$_2$CH$_2$O)$_X$—R$_2$;

J as defined above for G and G';

$_T$ is 4-45, desirably 5-30;

$_X$ is 0-45, desirably 0-40;

$_{T+X}$ must equal or be greater than 8 and in one embodiment when ratio of $_{X:T}$ after rounding to two places past the decimal is less than 1.50:1 and more desirably less than 1.40:1;

R$_2$ is a C$_1$-C$_{36}$ hydrocarbyl group, more desirably C$_1$-C$_{18}$, which hydrocarbyl group that can be a cyclic, branched or non-branched alkyl; aryl; alkylaryl or arylalkyl;

wherein the amount of Q is further defined as the sum of variables Q$_a$+Q$_b$ where Q$_a$ is the portion of Q where J is —N(H)— or >N— [e.g. CO—N(H)—(C$_\delta$H$_{2\delta}$—O)$_T$—(CH$_2$CH$_2$O)$_X$—R$_2$] and Q$_b$ is the portion of Q where J is —O— [e.g. CO—O—(C$_\delta$H$_{2\delta}$—O)$_T$—(CH$_2$CH$_2$O)$_X$—R$_2$]; with the provisions that a) the sum of G+Q$_a$ must together total at least 2.5 more desirably 5, [such that G could be about 0, 1, 2, 3, 4 or 5 and Q$_a$ would be the complementary amount (e.g. at least 5, 4, 3, 2, 1 or 0) to sum at least 5] and b) the sum of Q$_a$+Q$_b$+G must be at least 10;

wherein the amount of Q' is further defined as the sum of variables Q$_a$'+Q$_b$' where Q$_a$' is the portion of Q where J is —N(H)— or >N— and Q$_b$' is the portion of Q' where J is —O—'; with the provisions that a) the sum of G'+Q$_a$' must together total at least 2.5 more desirably 5, and b) Q$_a$'+Q$_b$'+G' must total at least 10;

E can desirably be from 20 to 90 number %, more desirably 60 to 90%, especially 60 to 70%'

G or G' can be from 0 to 35 number %, desirably from 5 to 10%,

Q or Q' can be from 5 to 80 number %, desirably from 5 to 40%, desirably 20 to 30% of the total number of E+G+Q or E+G'+Q', depending on whether the structure of the polyacid is shown by formula or described as a reaction product E:G:Q or E:G':Q' in a number ratio is desirably from 20-90:0-35:5-80 (provided that G+Q or G'+Q' must equal 10), and more desirably 60-90:0-35:5-40 and preferably 60-70:5-10:20-30.

The number of repeat units in the polyacid (E) is from 10-500, desirably from 10 to 200, and especially 10 to 100. The number average molecular weight of the polyacid before functionalization with the polyether is generally from about 700 to 50,000 g/mole, more desirably from about 700 to 28,000 and preferably from about 700 to 14,000 g/mole.

The aminic polybasic species can be a polyamine such as poly(vinylamine), alkylenepolyamine, or polyallylamine or poly(C$_{2-6}$-alkyleneimine) and in one preferred embodiment is polyethyleneimine. The polyamine or polyalkyleneimine may be linear or branched. The polyamine or polyalkyleneimine may have a number average molecular weight of from 140-100,000 g/mole; more desirably from 140 to 75,000; or preferably from 200 to 10,000 or 20,000. Desirably the amine polybasic species has a total of at least four primary and/or secondary amine groups per molecule and more desirably at least six primary and/or secondary amine groups.

Examples of polyamines include but are not limited to: aminofunctional polyamino acids such as poly(lysine) from Aldrich Chemical Co.; aminofunctional silicones which are available under the trade name Tegomer® ASi 2122 from Degussa AG; polyamidoamines which are available under the trade names Polypox®, Aradur® or "Starburst®" dendrimers from Aldrich Chemical Co.; polyallylamines and poly(N-alkyl)allylamines which are available under the trade names PAA from Nitto Boseki; polyvinylamines which are available from Mitsubishi Kasei and under the trade name Lupamin® from BASF AG; polyalkyleneimines, such as polyethyleneimines, which are available under the trade names Epomin® (Nippon Shokubai Co., Ltd.) and Lupasol® (BASF AG); and polypropyleneimines, which are available under the trade name Astramol® from DSM AG. Linear polyethyleneimine may be prepared by the hydrolysis of poly(N-acyl) alkyleneimines as described, for example, by Takeo Saegusa et al in *Macromolecules,* 1972, Vol 5, page 4470. Polypropyleneimine dendrimers are commercially available from DSM Fine Chemicals and poly(amidoamine) dendrimers are available as "Starburst" dendrimers from Aldrich Chemical Company. Alkylenepolyamines may be characterized as having less than two, usually less than 1% (by weight) material boiling below about 200° C. and include still bottoms such as ethylene polyamine still bottoms obtained from the Dow Chemical Company of Freeport, Tex.

When the aminic polybasic species is a polyimine it is preferably poly ($C_{2-6}$-alkyleneimine) and especially polyethyleneimine (PEI). The polyimine may be linear or especially branched.

The polyether functionalized polyacid and aminic polybasic species are reacted together such that —$CO_2H$ or —$CO_2^-$ (defined in B and further defined as E) reacts with the amine groups in polybasic species to give ionic salt bonds and/or covalent bonds or a mixture of ionic salt bonds and covalent bonds. The weight ratio of the polyether functionalized polyacid to aminic polybasic species is from 1:1 to 35:1, more desirably from 1:1 to 30:1 and preferably from 2:1 to 30:1. The weight ratio of polyether (including the J connecting group) to polyacid (including the C=O group) in the polyether functionalized polyacid is desirably from 1.5:1 to 1:20 and more desirably from 1:2 to 1:10. The reaction of the polyether functional polyacid with the aminic polybasic species is generally conducted at a lower temperature (e.g. generally 120° C. or less) than the reaction of the polyethers to functionalize the polyacid (generally above 120° C.). Thus, the chemical linkages (e.g. ester, amide, and imide) between the polyacid and the polyethers can be those associated with higher temperatures and the chemical linkages (salt, amide, and imide) between the polyacid and the aminic polybasic species are associated with lower reaction temperatures.

As both the polyether functionalized polyacid and the aminic polybasic species have multiple co-reactive groups, it is likely that there will be more than one bond (as defined above) between them. It is also acknowledged that more than one polyether functionalized polyacid can be bonded to a single aminic polybasic species. Similarly, there can be more than one aminic polybasic species chemically bonded to a single polyether functionalized polyacid.

When J is NH, 0-100% of the NH can react with an adjacent —$CO_2H$ or —C(=O)—$O^-$ (defined by A or B) to give —N< (a five membered imide ring repeat unit as shown below):

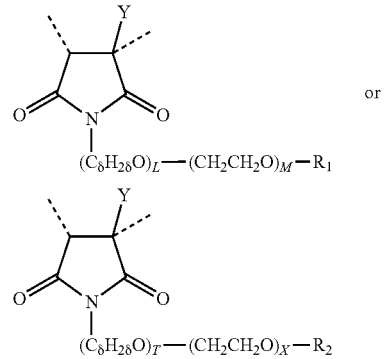

and/or with —$CH_2$—$CO_2H$ or —$CH_2$—C(=O)—$O^-$ (defined by Z) to give a five membered imide as shown below:

the repeat unit being of the structure

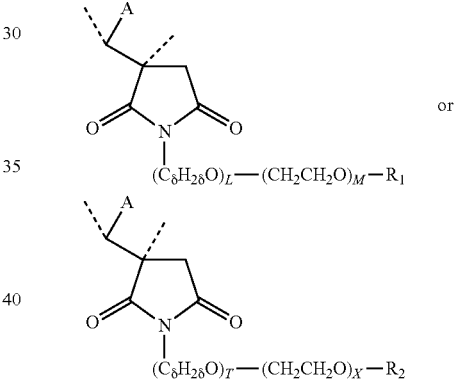

and/or two of adjacent repeat units from the polyacid might form a six membered imide ring when a nearby B is —$CO_2H$ or —C(=O)—$O^-$ and J is —N(H)— as shown below

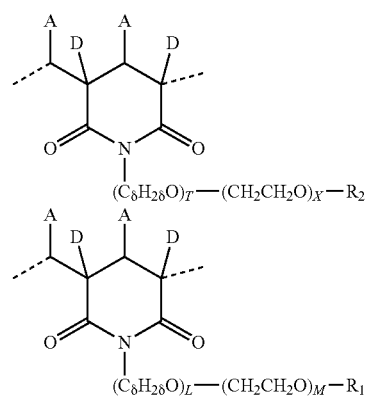

where Y, A, D, $\delta$, $_L$, $_M$, $_T$, $_X$, $R_1$ and $R_2$ are defined as above and the short dashed line indicates where the rest of the polyacid molecule is attached to the repeat unit.

DETAILED DESCRIPTION OF THE INVENTION

Definitions

To simplify things we will use parentheses around "meth" to indicate that a named molecule can optionally include a methyl substituent such as (meth)acrylic acid will refer to methacrylic acid and/or acrylic acid and methyl (meth)acrylate will refer to methacrylate and/or acrylate. In the polyether formulas we intend the larger alkylene oxide unit to comprise, propylene oxide, butylene oxide or combinations of propylene oxide and butylene oxide including linear and branched forms. We will also use $C_\delta H_{2\delta} O$ where $\delta$ is 3 and/or 4 to express this concept. We intend that the polyethers can be random or blocky and do not intend for them to limit the polyethers to a single block or blocks of any particular repeat unit. We will use the symbolic representation C(=O)—OH to represent carboxylic acid in any form such as the acid form, the salt form, or if two carboxylic acids are physically adjacent and can form an anhydride ring, the anhydride form. If the C(=O)—OH is adjacent to a nitrogen of an amide linkage we will also anticipate that it can be converted to a C(=O)— as part of an imide. We will use the term hydrocarbyl to describe a hydrocarbon type group with one hydrogen removed. Hydrocarbyl in this specification will mean hydrocarbon like and can include up to one oxygen or nitrogen for every four carbon atoms in the group, but preferably is just carbon and hydrogen atoms. Hydrocarbylene will mean hydrocarbon with two hydrogen atoms removed. Hydrocarbylene will also optionally include up to one oxygen or nitrogen atom for every two carbon atoms in the group, but preferably is just carbon and hydrogen. For the avoidance of doubt, when we are counting carboxylic acid or carbonyl groups, we will count an anhydride of a dicarboxylic acid and an imide as having two carbonyl groups.

Dispersants prepared by reaction of multi-acidic copolymers such as polyacrylic acid co acrylate ester/amides/imides with aminic polybasic species such as PEI have good dispersion properties in non-aqueous medium such as polyols. These can be used in various color concentrates for plastics or elastomers or for mill-bases, paints, inks, plastics, and elastomers as a dispersant. The dispersant can be described as being a reaction product of a polyether functionalized polyacid (having Σ repeat units in the polyacid) reacted with a aminic polybasic species and salts thereof, wherein the polyether functionalized polyacid comprises at least 95, 98, or 99 weight percent of repeat units of formula

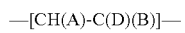
—[CH(A)-C(D)(B)]— wherein:
A is H, —C(=O)— when an nearby J is —N<, or B or mixtures thereof;
B is independently E, G, or Q;
E is —CO$_2$H, —W—P(=O)—(OH)$_\epsilon$ where $_\epsilon$ is 1 or 2, or —W—S(=O)$_2$—OH where W is a) a direct link between a backbone carbon atom and the phosphorus or sulfur atom, b) a hydrocarbylene linking group of either 1-7 carbon atoms defined to optionally including an ether, ester, or amide linking group and/or hydroxyl pendant groups, or c) a poly($C_{2-4}$-alkyleneoxide) of up to 7 repeat units and optionally including an ether, ester, or amide linking group;

when A is H; D is independently in each repeat unit Y or Z; Y is H or CH$_3$; and Z is —CH$_2$—C(=O)—OH, —CH$_2$-G, or —CH$_2$-Q;

desirably when A is —C(=O)—OH; D is Y; Y is independently in each repeat unit H or CH$_3$; E is only —C(=O)—OH and can't be a phosphorus or sulfur containing acid;

G is CO-J-($C_\delta H_{2\delta}$—O)$_L$—(CH$_2$CH$_2$O)$_M$—R$_1$, where $\delta$ is 3 and/or 4, the repeat units ($C_\delta H_{2\delta}$—O) and (CH$_2$CH$_2$O) may be in a random or block arrangement: G' is G without the —CO— group (the polyether reactant without the —CO— group of the carboxylic acid) or -J-($C_\delta H_{2\delta}$—O)$_L$—(CH$_2$CH$_2$O)$_M$—R$_1$;

J is —O—, >N— when an adjacent A or B is a —C(=O)—OH or D is —CH$_2$—C(=O)—OH, or —N(H)—. For the avoidance of doubt when we define in the specification or claims A, B, and D such that A or B is or D includes —C(=O)—OH, we mean that these components A and B are or in the case of D can include each of the acid form, ionized form, or the —C(=O)— form if the carbonyl is linked to a nearby nitrogen atom;

$_L$ is 0-20, desirably 0-5;
$_M$ is 3-60, desirably 5-25;
$_M$ must be greater than $_L$, and in one embodiment the ratio of $_{M:L}$ after rounding to two places past the decimal is at least 1.50:1 or more desirably at least 2.00:1:

R$_1$ is a C$_1$-C$_{36}$ hydrocarbyl group, desirably a C$_1$-C$_{18}$, especially C$_1$-C$_7$ which hydrocarbyl group that can be a branched, cyclic, non-branched alkyl; aryl, alkylaryl or arylalkyl;

Q is —C(=O)-J-($C_\delta H_{2\delta}$—O)$_T$—(CH$_2$CH$_2$O)$_X$—R$_2$ where $\delta$ is 3 and/or 4, the repeat units ($C_\delta H_{2\delta}$—O) and (CH$_2$CH$_2$O) may be in a random or block arrangement; Q' is the Q group without the —CO— group (the polyether reactant without the —CO— group of the carboxylic acid) or -J-($C_\delta H_{2\delta}$—O)$_T$—(CH$_2$CH$_2$O)$_X$—R$_2$;

J is —O—, >N— when a nearby B or A is —C(=O)—, or N(H) as defined above;

$_T$ is 4-45, especially 5-30;
$_X$ is 0-45; especially 0-40
$_{T+X}$ must equal or be greater than 8; and in one embodiment when ratio of $_{X:T}$ after rounding to two places past the decimal is less than 1.50:1 and more desirably less than 1.40:1;

R$_2$ is a C$_1$-C$_{36}$ hydrocarbyl group, desirably a C$_1$-C$_{18}$, which hydrocarbyl group can be a branched, cyclic, or non-branched alkyl; aryl, alkylaryl or arylalkyl;

with the provision that the Q is further defined as the sum of variables Q$_a$+Q$_b$ where Q$_a$ is the portion of Q where J is —N(H)— or >N— [e.g. —C(=O)—N(H)—($C_\delta H_{2\delta}$—O)$_T$—(CH$_2$CH$_2$O)$_X$—R$_2$] and Q$_b$ is the portion of Q where J is —O— [e.g. —C(=O)—O—($C_\delta H_{2\delta}$—O)$_T$—(CH$_2$CH$_2$O)$_X$—R$_2$];

with the provisions that a) the sum of G+Q$_a$ must together total at least 2.5, more desirably 5 [such that G could be about 0, 1, 2, 3, 4, or 5 and Qa would be the complementary amount (e.g. at least 5, 4, 3, 2, 1, or 0) to total at least 5] and b) the sum of Q$_a$+Q$_b$+G must be at least 10;

the ratio of E to G to Q is as follows:
E can be from 20 to 90, desirably 60 to 90 number %, especially 60 to 70%
G can be from 0 to 35 number %, desirably 5-10%,
Q can be from 5 to 80, desirably 5 to 40 number %, especially 20 to 30 of the total number of E+G+Q;

wherein the number of repeat units (Σ), including Σx or those of the formula —[CH(A)-C(D)(B)]—, in the polyether functionalized polyacid is about 10-500, especially about 10-200, or about 10-100;

with the provision that some of the —[CH(A)-C(D)(B)]— repeat units if J is >N— may be configured as a five membered ring from a single repeat unit where one of the A and B substituents is a carboxylic acid and the other is an amide linkage and the resulting repeat unit being of the structure

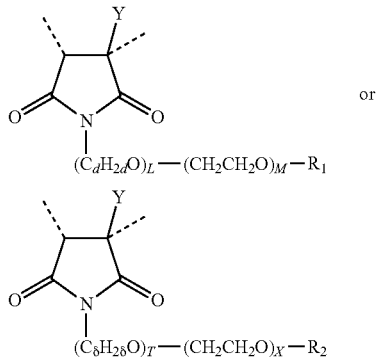

and/or if D is —CH$_2$—CO$_2$H or —CH$_2$—C(=O)—O$^-$ to give a five membered imide repeat unit as shown below:

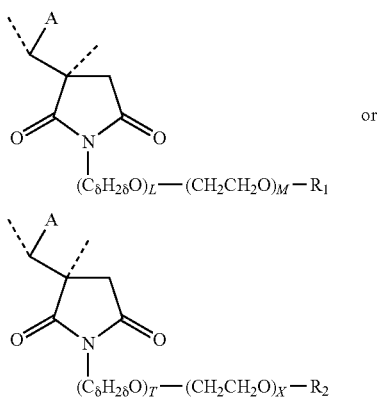

and/or if two of the repeat units of the polyacid might react with a single nitrogen when one B on one unit is —C(=O)OH and a B on an adjacent unit is an amide linkage to form a 6 membered ring

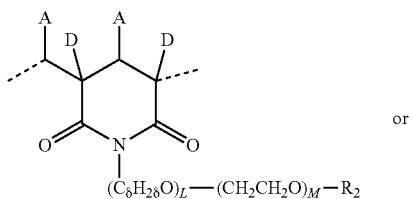

-continued

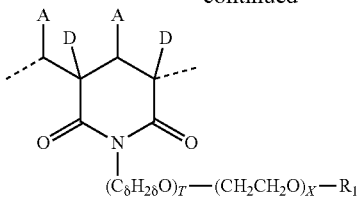

where Y, A, D, δ, $L$, $M$, $T$, $X$, R$_1$ and R$_2$ are defined as above. wherein the aminic polybasic species is a polyamine, which can be linear and/or branched and has a number average molecular weight from about 140 to about 100,000 g/mole; said reaction product includes one or more ionic and/or covalent bonds between said polyether functionalized polyacid and said aminic polybasic species and the weight ratio of the polyether functionalized polyacid to the aminic polybasic species is from 1:1 to 22:1; more desirably 2:1 to 22:1 and preferably 2:1 to 15:1.

In one embodiment, up to 50 mole % of the repeat units of the polyacid can be anionic monoethylenically unsaturated monomers containing sulphonic acid groups and/or phosphoric acid groups and/or phosphonic acid groups which may be in the free acid form or salt. As used herein, the term "phosphoric acid group" and "phosphonic acid group" of a phosphorus containing repeat unit refers to a phosphorus oxo acid having a POH moiety in which the hydrogen atom is ionizable. Also included in the term "phosphoric acid group" and "phosphonic acid group" are salts of the phosphorus oxo acid. In its salt or basic form, the phosphorus acid group has a cation such as an alkali earth or alkaline earth metal, an ammonium, substituted ammonium, quaternary ammonium or pyridinium ion replacing at least one acid proton. In its salt or basic form, the sulphonic acid group has a cation such as an alkali earth or alkaline earth metal, an ammonium, substituted ammonium, quaternary ammonium or pyridinium ion replacing at least one acid proton.

Examples of anionic monoethylenically unsaturated monomers containing sulphonic acid groups which may be in the free acid form or salt include allylsulfonic acid, methallylsulfonic acid, styrenesulfonic acid, vinylsulfonic acid, vinyl benzylsulphonic acid, allyloxybenzenesulfonic acid, 2-acrylamido-2-methylethanesulfonic acid, 2-acrylamido-2-methylpropanesulfonic acid, 2-acrylamido-2-methylbutanesulfonic acid, 2-methacrylamido-2-methylethanesulfonic acid, 2-methacrylamido-2-methylpropanesulfonic acid, 2-methacrylamido-2-methylbutanesulfonic acid, acryloyloxymethylsulfonic acid, 2-(acryloyl)oxyethylsulfonic acid, 3-(acryloyl)oxypropylsulfonic acid, 4-(acryloyl)oxybutylsulfonic acid, methacryloyloxymethylsulfonic acid, 2-(methacryloyl)oxyethylsulfonic acid, 3-(methacryloyl)oxypropylsulfonic acid, 4-(methacryloyl)oxybutylsulfonic acid, and their salts thereof.

Examples of anionic monoethylenically unsaturated monomers containing phosphoric or phosphonic acid groups which may be in the free acid form or salt include monovinyl phosphate, monoallyl phosphate, 3-butenylphosphonic acid, mono-3-butenyl phosphate, mono(4-vinyloxybutyl) phosphate, the phosphate esters of [hydroxyalkyl(meth)acrylates, hydroxyalkyl(meth)acrylamides or their polyalkoxylate derivatives of molecular weight Mn 150-700 such as 2-hydroxyethyl(meth)acrylate, hydroxypropyl(meth)acrylate and 4-hydroxybutyl(meth)acrylate, N-hydroxyethylacrylamide, N-hydroxyethylmethacrylamide hydroxypoly(ethyleneoxide)(meth)acrylate, and polypropyleneglycol (meth) acrylate], mono(2-hydroxy-3-vinyloxypropyl) phosphate, mono(1-phosphonoxymethyl-2-vinyloxyethyl) phosphate, mono(3-allyloxy-2-hydroxypropyl) phosphate, mono(2-allyloxy-1-phosphonoxymethylethyl) phosphate, their salts and/or esters, especially C1 to C8 monoalkyl, dialkyl and, if appropriate, trialkyl esters, of the monomers containing phosphoric acid and/or phosphonic acid groups. Other suitable phosphonic acid monomers are disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy)phosphinylalkyl (meth)acrylate monomers, disclosed in U.S. Pat. No. 4,733,005, and include (hydroxy)phosphinylmethyl methacrylate. One preferred monomer is vinylphosphonic acid, or hydrolyzable esters thereof.

In one embodiment, up to 5 mole % (more desirably up to 2 or up to 1 mole %) of the repeating units of the polyacid component can be derived from a free radically polymerizable monomer containing a carbon-to-carbon double bond and being without a carboxylic group or acids from sulfur or phosphorus, such repeat units will be from styrene, ethylene, propene, butenes, (meth)acrylate esters of (meth)acrylic acid and $C_1$-$C_{18}$ alcohols, and (meth)acrylate hydroxyl ester such as hydroxyl ethyl (meth)acrylate, hydroxyl butyl (meth)acrylate, vinyl acetate, (meth)acrylamides, vinyl substituted heterocyclics such as vinyl pyrrolidinone, vinyl imidazole, vinyl carbazole, 2-vinylpyridine, and 4-vinylpyridine. If we are describing the polyacid component before functionalization with the polyether species we can say the up to 5, 2, or 1 mole % is approximately up to 5, 2, or 1 weight percent (of the different monomer) based on the weight of the polyacid component before functionalization with the polyether.

In one embodiment any of the acid species of the polyacid component not reacted with the aminic polybasic species may be reacted with mono or polyamines with three or less primary or secondary amine groups.

In one embodiment, the E group of the polyacid, the polyether functionalized polyacid, or the reaction product of the polyacid with the aminic polybasic species can be up to 100% in the —$CO_2H$ form or the —$CO_2^-$ form. The —$CO_2^-$ form will generally carry a counterion such as a monovalent alkali metals (Li, Na, K, Rb, Cs, and Fr) or divalent alkaline earth metals (Be, Mg, Ca, Sr, Ba, and Ra). Lithium, sodium and potassium are preferred counterions. They give the structures: —$CO_2^-Li^+$, —$CO_2^-Na^+$ or —$CO_2^-K^+$. When the polyacid component includes acids from sulfur or phosphorus or where E is —W—P(=O)—$(OH)_\epsilon$ where $\epsilon$ is 1 or 2, or —W—S(=O)$_2$—OH then optionally the acids including sulfur or phosphorus can be in the form of salts with the above counterions. Preferentially less than 20, 10, 5, or 2 mole % (preferably less than 2 mole %) of the acid groups are neutralized with metals.

As noted above the dispersant may be present in the form of a salt. Where the dispersant contains a carboxylic acid group the salt may be that of an alkali metal such as lithium, potassium or sodium. Alternatively the salt may be formed with ammonia, an amine, quaternary ammonium or pyridinium cation. Examples of amines are methylamine, diethylamine, ethanolamine, diethanolamine, hexylamine, 2-ethylhexylamine and octadecylamine. The quaternary ammonium cation may be a quaternary ammonium cation or a benzalkonium cation. The quaternary ammonium cation may contain one or two alkyl groups containing from 6 to 20 carbon atoms. Examples of quaternary ammonium cations are tetraethyl ammonium, N-octadecyl-N,N,N-trimethyl ammonium; N,N-didodecyl-N,N-dimethyl ammonium, N-benzyl-N,N,N-trimethyl ammonium and N-benzyl-N-octadecyl-N,N-dimethyl ammonium cation.

In one embodiment, the reaction product or co-polymer product from reacting the polyether functionalized polyacid with the polybasic species may be presented as a neat polymer or a polymer in an organic solvent. This can be achieved by dissolving the neat reaction product or co-polymer product into the solvent, or by carrying out the synthesis of the reaction product or co-polymer product in the solvent.

In one embodiment, the reaction product from reacting the polyether functionalized polyacid with the polybasic species can be further functionalized to adapt their properties and application performance to specific requirements. The modification reactions below may be combined where necessary, to give multiply modified polyacid polybasic addition compounds. Where two or more modifying reactions are to be carried out in succession, it should be ensured that enough groups are available that are reactive for one or more subsequent reactions in the molecule.

The stated modifications are advantageous embodiments of the present invention and can be realized by:

a) reaction of one or more of the remaining free amino groups of the aminic polybasic species with isocyanates, lactones, anhydrides, epoxides, cyclic carbonates, or (meth)acrylates;

b) salification and/or reaction of one or more of the remaining free amino groups of the aminic polybasic species with mono or polycarboxylic acids, mineral acids, phosphorus and polyoxometallate containing acids or strong acids;

c) oxidation of one or more of the of the remaining free amino groups of the aminic polybasic species to nitrogen oxides;

d) quaternization of one or more of the remaining free amino groups of the aminic polybasic species; or e) reaction of one or more of the remaining free amino groups of the aminic polybasic species with one or more mono amino-reactive group terminated polymer(s) of MW 150-3000.

The modification of any remaining amino groups may take place in a way which is known to the skilled person. For example, salification and quaternization of the amino nitrogen atom can be achieved using mineral acids, strong acids, alkyl sulfates, alkyl or aralkyl halides, halocarboxylic esters, alkyl oxalates or epoxides. Such quaternization is preferred when, for example, amino groups will react with a binder system into which the pigment paste is incorporated and cause flocculation. Suitable reagents for this purpose include hydrochloric acid, acetic acid, sulphuric acid, alkyl sulphonic acids, alkyl hydrogen sulphates or aryl sulphonic acids. Quaternizing agents include dimethyl sulphate, benzyl chloride, methyl halides such as chlorine, bromine and iodine, dimethyl oxalate, ethylene oxide, propylene oxide and styrene oxide in the presence of acids, and propane (or butane) sultone.

Salification and/or reaction of one or more of the remaining free amino groups of the aminic polybasic species with mono or polycarboxylic acids or phosphorus containing acids are disclosed in JP 9 157 374, US 2010/0017973 and US2013/0126804. Specific examples of suitable mono carboxylic acids include optionally substituted $C_{1-50}$ aliphatic monocarboxylic acids such as acetic acid, propionic acid, caproic acid, caprylic acid, 2-ethylhexanoic acid, nonanoic acid, decanoic acid, lauric acid, myristic acid, palmitic acid, oleic acid, linoleic acid, stearic acid, arachidic acid, erucic acid, behenic acid, methoxyacetic acid, mixtures of fatty acids derived from oils from naturally occurring sources such as sunflower oil, rape seed oil, castor oil and olive oil, branched alkyl carboxylic acids available under the trademark Isocarb™ (ex Sasol), Unicid™ acids which are linear $C_{25-50}$ synthetic primary acids commercially available from Baker Hughes and aromatic carboxylic acids such as benzoic acid, salicylic acid and naphthoic acid. Specific examples of suitable polycarboxylic acids include succinic acid, malonic acid, adipic acid, sebacic acid, malic acid, fumaric acid, citric acid and tartaric acid. Specific examples of suitable phosphorus containing acids include phosphoric acid and phosphorous acid. Specific examples of suitable polyoxometallate containing acids include phosphomolybdic acid, phosphotungstic acid and silicomolybdic acid.

Reaction of one or more of the remaining free amino groups of the aminic polybasic species with anhydrides are disclosed in U.S. Pat. Nos. 6,878,799 and 7,767,750. Specific examples of suitable anhydrides include maleic anhydride, succinic anhydride, phthalic anhydride, tetrahydrophthalic anhydride, methyltetrahydrophthalic anhydride, hexahydrophthalic anhydride, methylhexahydrophthalic anhydride, trimellitic anhydride, $C_{1-20}$ alkenyl and alkyl succinic anhydrides.

Reaction of one or more of the remaining free amino groups of the aminic polybasic species is disclosed in JP 4 031 471. Specific examples of suitable epoxides include styrene oxide, propylene oxide and ethylene oxide.

Reaction of one or more of the remaining free amino groups of the aminic polybasic species carboxylic acid, sulfonic acid, sulfuric acid, phosphonic acid, phosphoric acid, isocyanate, epoxide, (meth)acrylate, acetoacetoxy or cyclocarbonate terminated polymers. The reaction products can be in the form of an amide and/or the corresponding salt when a carboxylic acid terminated polymer is used, a salt when sulfonic acid, sulfuric acid, phosphonic acid and phosphoric acid terminated polymers are used and a covalent bond is formed between the NH functionality of the amino group and i) an isocyanate terminated polymer to give a urea, ii) an epoxide terminated polymer to ring open the epoxy group giving an amino alcohol, and iii) a (meth) acrylate terminated polymer via a Michael addition across the double bond. These mono-reactive terminated polymers can be based on polyesters, polyethers, polyether/polyester, polyamide, polyesteramide, poly(meth)acrylates, polyurethanes and mixtures thereof. Particularly useful mono-reactive polymers have been disclosed in various patents.

Suitable examples of carboxylic acid terminated polyester, polyesteramide and polyamide polymers are disclosed in U.S. Pat. Nos. 4,224,212, 4,861,380, 5,700,395, 5,760,257, 6,197,877, 8,202,935, JP 4 866 255, JP 8 010 601, JP 9 157 361, WO 2006/113258 and WO 2007/039605 in which;
a) the polyesters are derived from the polymerisation of:—
one or more of a hydroxycarboxylic acid and/or a lactone optionally in the presence of initiator molecules containing a carboxylic acid or ester functionality; or
one or more of a diol with one or more of a dibasic acid/anhydride optionally in the presence of initiator molecules containing a carboxylic acid or ester functionality;
b) the polyesteramides are derived from the polymerisation of:—
one or more of a hydroxycarboxylic acid and/or a lactone with one or more of an aminocarboxylic acid and/or a lactam optionally in the presence of initiator molecules containing a carboxylic acid or ester functionality; and
c) the polyamides are derived from the polymerisation of:—
one or more of an aminocarboxylic acid and/or a lactam optionally in the presence of initiator molecules containing a carboxylic acid or ester functionality; or
one or more of a diamine with one or more of a dibasic acid/anhydride optionally in the presence of initiator molecules containing a carboxylic acid or ester functionality.

Specific examples of suitable hydroxycarboxylic acids and lactones include ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid, glycolic acid, β-propiolactone, β-butyrolactone, optionally $C_{1-6}$-alkyl substituted ε-caprolactone and optionally $C_{1-6}$-alkyl substituted δ-valerolactone such as ε-caprolactone and the 7-methyl-, 3-methyl-, 5-methyl-, 6-methyl-, 4-methyl-, 5-tetrabutyl-, 4,4,6-trimethyl- and 4,6,6-trimethyl-ε-caprolactone, δ-valerolactone, β-methyl-δ-valerolactone or mixtures thereof.

Specific examples of suitable diols include alkylene glycols such as ethylene glycol, propylene glycol, neopentyl glycol, 1,4-butanediol, 1,6-hexanediol, diols with ether linkages such as diethylene glycol, dipropylene glycol, tripropylene glycol and triethylene glycol. Examples of suitable polyalkylene glycols include polyethylene glycols, polypropylene glycols, polybutylene glycols, mixed block and random copolymers of polyethylene glycol and polypropylene glycol (Pluronic and reverse pluronic ex BASF) with MW less than 1000.

Specific examples of suitable dibasic acids and anhydrides include maleic anhydride, succinic anhydride, glutaric anhydride, fumaric acid, malonic acid, adipic acid, sebacic acid, phthalic anhydride, and cyclohexane dicarboxylic anhydride.

Specific examples of suitable aminocarboxylic acids include sarcosine, beta-alanine, 4-aminobutyric acid, 6-aminocaproic acid and 11-aminoundecanoic acid.

Specific examples of suitable lactams include laurolactam and caprolactam.

Specific examples of suitable diamines include alkylene diamines such as ethylenediamine, 1,2-propylenediamine, 1,3-propylene diamine, the isomeric butylenediamines, pentanediamines, hexanediamines, heptanediamines, 1,12-diaminododecane, diaminocyclohexanes, and diamines with ether linkages such as 1,2-bis(2-aminoethoxy)ethane. Examples of suitable polyetherdiamines include Jeffamine diamines commercially available from Huntsman such as D230, D400, ED600.

Examples of suitable initiator molecules containing a carboxylic acid or ester group include optionally substituted $C_{1-50}$ aliphatic monocarboxylic acids as described above and their methyl or ethyl esters.

Suitable examples of phosphate, sulphate and sulphonate terminated polyester polymers are disclosed in U.S. Pat. Nos. 4,861,380 and 6,197,877 in which the polyesters are derived from the polymerisation of hydroxycarboxylic acids and/or lactones as disclosed above using initiator molecules containing a hydroxyl or amino functionality. Specific examples of suitable initiator molecules containing a hydroxyl functionality include alcohols with optionally substituted C1-50 hydrocarbylene groups such as methanol, ethanol, propan-1-ol, propan-2-ol, butanol, isobutanol, neopentyl alcohol, hexanol, octan-1-ol, 2-ethylhexanol, decanol, dodecanol, oleyl alchol, stearyl alcohol, behenyl alcohol, cyclohexanol, benzyl alcohol, phenol, octylphenol, nonylphenol, phenylethanol, fluorinated alcohols such as 1H,1H,2H,2H-perfluoro-1-decanol, C8-36 branched alcohols available under the trademark Isofol™ (ex Sasol), Unilin™ alcohols which are linear $C_{25-50}$ synthetic primary alcohols commercially available from Baker Hughes. Specific examples of suitable initiator molecules containing an amino functionality include amines such as butylamine, dodecylamine, stearylamine.

Suitable examples of (meth)acrylate terminated polyester, polyesteramide and polyamide polymers are disclosed in EP 713 894, JP 3 488 001, JP2010222522 and U.S. Pat. No. 8,202,935 in which the polyesters are derived from the polymerisation of hydroxycarboxylic acids and/or lactones as disclosed above using:—
  i. initiator molecules such as 2-hydroxyethylacrylate directly;
  ii. initiator molecules containing a hydroxyl functionality then subsequent transesterification reaction with a (meth)acrylate ester;
  iii. initiator molecules containing a carboxylic acid or ester functionality as described above and then subsequent reaction with a (meth)acrylate ester containing a hydroxyl functionality such as 2-hydroxyethylacrylate or an epoxy functionality such as glycidyl methacrylate.

Suitable examples of phosphate, sulphate and sulphonate terminated polyether, polyether/polyester, polyether/polyurethane and polyether/polyester/polyurethane polymers are disclosed in U.S. Pat. Nos. 5,130,463, 5,151,218, 6,111,054, 6,310,123, 7,595,416 and 8,202,935 in which the polyethers are derived from the polymerisation of alkylene and alkarylene oxides such as ethylene oxide, propylene oxide, butylene oxide and styrene oxide using initiator molecules containing a hydroxyl or amino functionality as disclosed above. These polyether mono alcohols can be further reacted with one or more hydroxycarboxylic acids or lactones as disclosed above or with diols and diacids as described above to give the polyether polyester polymers containing an alcohol group which can then be phosphated as disclosed in U.S. Pat. No. 5,130,463. The polyether mono alcohols and polyether polyester monoalcohols can be reacted further with diols as disclosed above in combination with diisocyanates to give polyether polyurethane and polyether polyester polyurethane polymers respectively containing an alcohol group which can then be phosphated as disclosed in U.S. Pat. No. 5,130,463. Specific examples of suitable diisocyanates include hexamethylenediisocyanate (HDI), 2,4- and 2,6-toluenediisocyanate (TDI), isophoronediisocyanate (IPDI), α,α-tetramethylxylene diisocyanate (TMXDI), diphenylmethane-4,4-diisocyanate (4,4'-MDI), diphenylmethane-2,4'-diisocyanate (2,4'-MDI) and dicyclohexylmethane-4,4-diisocyanate (HMDI).

Suitable examples of (meth)acrylate terminated polyether polymers are disclosed in U.S. Pat. No. 7,923,474 and JP2010222522.

Suitable examples of carboxylic acid terminated polyether polymers are disclosed in JP 4 248 207, U.S. Pat. Nos. 7,767,750, 7,671,119, 7,872,070, 8,076,409 and 8,168,713 in which polymers are derived from i) the reaction of polyalkyleneglycol mono substituted ethers with halocarboxylate salts such as sodium monochloroacetate and then acidified using hydrochloric acid; ii) the reaction of polyalkyleneglycol mono substituted ethers with acrylonitrile and then hydrolysed in the presence of acids such as hydrochloric acid; and iii) the reaction of polyetheramines with anhydrides.

Suitable examples of isocyanate terminated polyester and polyether polymers are disclosed in JP 4 031 471, JP 7 149 855 and WO2007/039605 Suitable examples of epoxide or acetoacetoxy or cyclocarbonate terminated polyacrylate polymers are disclosed in U.S. Pat. No. 5,100,969.

In one embodiment, this reaction product or co-polymer product may be presented as a mixture with an appropriate polymer. This can be achieved by mixing the neat dispersant reaction product or co-polymer product with the reactive monomers or polymers, or by carrying out the synthesis of the dispersant reaction product or co-polymer product in the presence of the precursor monomer or polymer to the desired polymer. In one embodiment, a polyol diluent will be used and subsequent to formation of the dispersant reaction product or copolymer a particulate (such as a pigment) will be dispersed in the polyol and then the polyol will be converted into a urethane prepolymer or polymer by reacting with a polyisocyanate.

The inventors of this invention have discovered that the compositions disclosed herein are capable of at least one of increasing a particulate solid load and/or forming improved dispersions with reduced viscosity in an organic medium.

The dispersants as disclosed below, have a high dispersant activity in organic medium, therefore allows an increase in particulate matter (such as filler or pigment) that can be added to an organic medium due to an efficient reduction in viscosity of the mix. Furthermore, the dispersants facilitate particle size reduction of the particulate in an organic medium to form a dispersion with reduced or more uniform particle size. The dispersant functions to colloidally stabilize newly formed particle surfaces minimizing aggregation and facilitating particle size reduction.

In one embodiment, the invention provides an easily modified polymeric dispersant where the anchoring species can be modified in terms of molecular size and basicity to anchor to a variety of particulate matter and the polyether modified polyacid can be made more or less polar, larger or smaller in molecular weight, more or less branched, etc. to optimize the solubilizing portion of the dispersant for various different continuous phases and end uses.

In one embodiment, the invention provides a composition comprising a particulate solid (typically a pigment or filler), the dispersant material, an organic medium (typically the organic medium may be a plastics material, an elastomer material, a precursor to a plastics or elastomer material, or an organic liquid) and a finely divided particulate solid dispersed in the continuous phase and colloidally stabilized by the dispersant material.

In one embodiment, the invention provides a composition comprising the above dispersion of particulate solid, dispersant and medium as a color concentrate, mill-base, ink, or coating. In the case of the coating the dispersion will further comprise a binder resin and optional formulating additives useful in coatings of the desired type.

Carbon black pigments are used in polyurethane plastic applications to provide colour, these plastics are used in a variety of products including car dash board interiors and shoe soles. For the carbon black pigment to be incorporated into the polyurethane plastic it desirably is first dispersed into a polyol, to give a black slurry. This slurry can then be mixed with a di-isocyanate to form the polyurethane plastic. The particle size, solids loading, colloidal stability and viscosity of the carbon black slurry are therefore very important in the manufacture of gray or black polyurethane plastic. Lower viscosity carbon black slurries with higher pigment concentration are desirable.

In one embodiment, the polyacid will be primarily polyacrylic acid (e.g. >50% of the repeating units will be conventional repeat unit from polymerizing acrylic acid). In one embodiment, the polyacid will include from 5 to 50 number percent of repeating units from maleic acid or a maleic anhydride.

Various preferred features and embodiments will be described below by way of non-limiting illustration.

When J is —NH— or —N< the G, G', Q, or Q' group may be derived from a poly(alkyleneoxide) monoalkyl ether monoamine. The monoamine compounds of this type are commercially available as the Surfonamine® or Jeffamine™ amines from Huntsman Corporation. Specific examples of Surfonamine® amines are B-60 (propylene oxide to ethylene oxide mole ratio of 9:1), L-100 (propylene oxide to ethylene oxide mole ratio of 3:19), B-200 (propylene oxide to ethylene oxide mole ratio of 29:6) and L-207 (propylene oxide to ethylene oxide mole ratio of 10:32), L-200 (propylene oxide to ethylene oxide mole ratio of 3:41), L-300 (propylene oxide to ethylene oxide mole ratio of 8:58).

When J is oxygen, the G, G', Q, or Q' group may be derived from a poly(alkyleneoxide) monoalkyl ether. These mono-alkyl ethers are available from a variety of sources such as Sigma-Aldrich, Croda, BASF and Ineos.

The polyacid may be prepared by processes known to a skilled person and functionalized with the polyether species by any method known to the art. For example, the polyacid may be prepared by esterification or amidation of poly(meth)acrylic acid or poly(meth)acrylic acid/maleic acid copolymer, or polymerization of (meth)acrylic acid with (meth)acrylic esters and/or amides or polymerization of (meth)acrylic acid with maleic acid (or maleic anhydride), (meth)acrylic esters and/or amides and maleic acid esters and/or amides by any known polymerization technique or a combination of polymerization techniques using a bulk, solution, suspension or emulsion process. The polymerization may comprise of a radical, anionic, cationic, atom transfer or group transfer polymerization process or combinations thereof.

In one embodiment, the invention further provides for a composition comprising particulate solid (typically a pigment or filler), the dispersant, and an organic medium (typically, the organic medium may be a plastics material, an elastomer material, a precursor to a plastic or elastomer material, or an organic liquid).

In one embodiment, the invention provides for a compound obtained or obtainable by reacting a polyacid (typically with a number average molecular weight between 700 to 50,000, or 700 to 28,000), either as an aqueous solution or a solid with Q'-H and G'-H as defined herein, in a weight ratio of polyether (G'-H and Q'-H) to polyacid is from 1:1.5 to 1:20 and more desirably from 1:2 to 1:10, optionally in the presence of a catalyst, typically an acid or base catalyst, at a temperature between 120 and 200° Celsius, under an inert atmosphere, for a duration of between 2 and 72 hours, ensuring that water present in the reaction or generated during the reaction is removed. This generates an intermediate which is subsequently reacted with an aminic polybasic species in a weight ratio of the polyether functionalized polyacid (formed above) to the aminic polybasic species of from 1:1 to 22:1, at a temperature between 30 and 130° C., for a duration of between 0.25 to 24 hours, under an inert atmosphere in the absence of water. Sometimes this is conducted in an appropriate solvent or polymeric carrier while in other circumstances the reactants are processed neat (without solvent) optionally as a melt.

As used herein, the expression substantially free of water indicates that the reaction contains a minimal amount of water, for instance contaminant or trace amounts not removed in normal processing.

The reaction product of the polyether functionalized polyacid with the aminic polybasic species may have a number average molecular weight from 1000 to 300,000, or more desirably from 2000 or 5000 to 75,000 or 150,000 g/mole.

In one embodiment, the above processes can be carried out, by those skilled in the art, using a variety of copolymers such as poly(meth)acrylic-co-maleic acid; polyacrylic-co-itaconic acid; polyacrylic-co-AMPS acid, polyitaconic-co-acrylate acid; polyitaconic-co-acrylamide acid; etc. in place of poly(meth)acrylic acid.

The finely divided particulate solid (typically a pigment or filler) may have an average particle size measured by light scattering techniques of from 10 nanometers to 10 microns, or desirably from 10 nanometers to 1, 2, 3, or 5 microns, or preferably from 20 nanometers to 1, 2, 3, or 5 microns in diameter. The particles size ranges are fairly broad because in some embodiments a larger particle size is initially present and then the particle size is further reduced in the presence of the dispersant of this specification.

INDUSTRIAL APPLICATION

In one embodiment, the reaction product or copolymer disclosed herein is a dispersant, typically used for dispersing particulate solid materials.

The reaction product or copolymer disclosed herein in different embodiments is present in the composition of the invention in a range selected from 0.1 to 50 wt. %, or 0.25 to 35 wt. %, and 0.5 to 30 wt. % based on the weight of the dispersion of particulate in organic media.

The particulate solid present in the composition may be any inorganic or organic solid material which is substantially insoluble in the organic medium at the temperature concerned and which it is desired to be stabilized in a finely divided form therein. The particulate solids may be in the form of a granular material, a fibre, a platelet or in the form of a powder, often a blown powder. In one embodiment, the particulate solid is a filler or pigment.

Examples of suitable solids are pigments, extenders, fillers, blowing agents and flame retardants for plastics materials; dyes, especially disperse dyes; metals; particulate ceramic materials and magnetic materials for ceramics, ceramic pigments, abrasives, capacitors, or fuel cells, ferrofluids; organic and inorganic nano-disperse solids; fibres such as wood, paper, glass, steel, or carbon and boron for composite materials.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxy-metallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and nonreinforcing carbon black, graphite, Buckminsterfullerenes, asphaltene, graphene, diamond, alumina, quartz, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, incinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates.

The organic medium present in the composition of the invention in one embodiment is a plastics or elastomer material or precursors to plastic or elastomeric material and in another embodiment is an organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility", by Crowley et al., in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility", by Ibert Mellan (published in 1968 by Noyes Development Corporation), in Table 2.14 on pages 39-40, and these liquids all fall within the scope of the term polar organic liquid as used herein.

In one embodiment, polar organic liquids include dialkyl ketones, alkyl esters of alkane carboxylic acids and alkanols, especially such liquids containing up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, diisobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of organic liquids which may be used as polar organic liquids are film-forming resins. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid includes at least 0.1% by weight, or 1% by weight or more of a polar organic liquid based on the total organic liquid.

In one embodiment, the organic liquid is free of water. In one embodiment, the organic continuous medium has less than 5 wt. % water, more desirably less than 2 or 1 wt. % water, and in another embodiment less than 0.5 wt. % water based on the weight of the organic continuous medium.

The plastics material may be a thermosetting resin or a thermoplastic resin. The thermosetting resins useful in this invention include resins which undergo a chemical reaction when heated, catalysed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

The plastics material such as a thermoset resin may be useful for parts in boat hulls, baths, shower trays, seats, conduits and bulkheads for trains, trams, ships aircraft, body panels for automotive vehicles and truck beds.

If desired, the compositions containing plastic material may contain other ingredients, for example dispersants other than the compound of the present invention, antifogging agents, nucleators, blowing agents, flame retardants, process aids, surfactants, plasticisers, heat stabilizers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling, high shear mixing or plastic milling until the dispersion is formed. Alternatively, the solid may be treated to reduce its particle size independently or in admixture with either, the organic medium or the dispersant, the other ingredient or ingredients then being added and the mixture being agitated to provide the composition.

In one embodiment, the composition of the present invention is suited to liquid dispersions. In one embodiment, such dispersion compositions comprise: (a) 0.5 to 40 parts of a particulate solid, (b) 0.5 to 30 parts of the reaction product of the polyether functionalized polyacid with the aminic polybasic compound, also known as the copolymer disclosed herein, and (c) 30 to 99 parts of an organic medium; wherein all parts are by weight and the amounts (a)+(b)+(c)=100.

In one embodiment, component a) includes 0.5 to 40 parts of a pigment and such dispersions are useful as mill-bases.

As disclosed hereinbefore, the compositions of the invention are suitable for preparing mill-bases wherein the particulate solid is milled in an organic liquid in the presence of a the reaction product of the polyether functionalized polyacid with the aminic polybasic species also known as the copolymer disclosed herein, or salts thereof.

Thus, according to a still further embodiment of the invention, there is provided a mill-base including a particulate solid, an organic liquid and the reaction product of the polyether functionalized polyacid with the aminic polybasic species also known as the copolymer disclosed herein, or salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling. The binder is a polymeric material capable of binding the composition on volatilization of the organic liquid.

Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 20% by weight of the mill-base. Higher concentrations are desirable for high surface area materials like some carbon blacks and nano-particles.

Dispersions and mill-bases made from the composition of the invention are particularly suitable for use in non-aqueous and solvent free formulations in which energy curable systems (ultra-violet, laser light, infra-red, cationic, electron beam, microwave) are employed with monomers, oligomers, etc., or a combination present in the formulation. They are particularly suitable for use in plastics; polyol and plastisol dispersions; non-aqueous ceramic processes, especially tape-casting, gel-casting, doctor-blade, piezoceramic printing, extrusion and injection moulding type processes. A further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, and plastics materials. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions.

In one embodiment, the composition of the invention further includes one or more additional known dispersants.

The following examples provide illustrations of the invention. These examples are non-exhaustive and are not intended to limit the scope of the invention.

EXAMPLES

List of Ingredients

Carbosperse™ K752, a polyacrylic acid with a weight average molecular weight 2000 g/mole available from Lubrizol at 63 wt. % active in water.
Carbosperse K732, a polyacrylic acid with a weight average molecular weight 6000 g/mole available from Lubrizol at 50% active in water.
Poly(acrylic-co-maleic acid) molecular weight 3000 g/mole, available from Sigma-Aldrich as 50% active in water.
Surfonamine™ L-100, a polyetheramine available from Huntsman.
Surfonamine B-200, a polyetheramine available from Huntsman.
Poly(ethylene glycol-ran-propylene glycol) monobutyl ether, molecular weight 970 g/mole available from Sigma-Aldrich
Poly(ethylene glycol-ran-propylene glycol) monobutyl ether, molecular weight 1700 g/mole available from Sigma-Aldrich
Polyether amine, consisting of C12-15 alcohol reacted with propylene oxide (MW 1660), followed by base catalyzed addition of the resultant polyetheralcohol to acrylonitrile and subsequent hydrogenation to give an amine (85% active) available from Lubrizol.
Polyether amine, consisting of C12-15 alcohol reacted with butylene oxide (MW 1700), followed by base catalyzed addition of the resultant polyetheralcohol to acrylonitrile and subsequent hydrogenation to give an amine (80% active) ex Lubrizol.
Poly(ethylene glycol) methyl ether, molecular weight 750 g/mole, available from Sigma-Aldrich.
Poly(ethylene glycol) methyl ether, molecular weight 500 g/mole available from Ineos.
Poly(ethylene glycol) methyl ether, molecular weight 350 g/mole available from Ineos.
Synperonic™ A11 (a polyether alcohol, consisting of a C13/15 alcohol mixture which is 50% linear and 50% monobranched reacted with ethylene oxide (MW 484)) available from Croda.
Poly(propylene glycol) monobutyl ether molecular weight 1000 g/mole available from Sigma-Aldrich.
Toluene, available from Fisher.
Polypropylene glycol molecular weight 1000 g/mole available from Sigma-Aldrich.
Tetraethylenepentamine, available from Sigma-Aldrich.
Epomin™ SP-006 molecular weight 600 g/mole available from Nippon Shokubai.
Epomin SP-018 molecular weight 1800 g/mole available from Nippon Shokubai.
Epomin P-1050 molecular weight 70,000 g/mole available from Nippon Shokubai.
Ortho Phosphoric acid, available from Fisher as a 85% solution in water.
Succinic anhydride, available from Sigma-Aldrich.
Dimethyl Sulphate, available from Sigma-Aldrich.
Phosphate polyalkyleneglycol monoalkylether, synthesized in accordance to Example 9 from U.S. Pat. No. 6,051,627.
Printex™ 60, available from Evonik.
Poly(itaconic acid) molecular weight 30,000 g/mole, available from Lubrizol at 46% active in water.
Isopropyl alcohol, available from Fisher.
Albritect CP-30 a polyacrylic-co-vinyl phosphonic acid with a weight average molecular weight 30,000-90,000 g/mole, available from Rhodia at 20% active in water.
Carbosperse™ K-775 a polyacrylic acid copolymer containing sulfonic acid groups with a weight average molecular weight 15,000 g/mole, available from Lubrizol at 50% active in water.
Poly(methacrylic acid) molecular weight 3,000 g/mole, available from Lubrizol at 35.37% active in water.
Surfonamine B-100, a polyetheramine available from Huntsman.
Surfonamine L-207, a polyetheramine available from Huntsman.
Polyallylamine available as PAA-01 from Nittobo at 15% active in water.
Dimethylaminopropylamine, available from Sigma-Aldrich.
Hydrogen peroxide, available from Sigma-Aldrich.
Phenyl isocyanate, available from Sigma-Aldrich.

INTERMEDIATE EXAMPLES

Example 1

Carbosperse K752 (26.52 parts) and Surfonamine L-100 (23.20 parts) and Poly(ethylene glycol-ran-propylene glycol) monobutyl ether (MW 970, 69.62 parts) are charged to a reaction flask and heated, under a nitrogen blanket with a trap fitted, to 120° C. and stirred for 3 hours, then heated to 140° C. and stirred for 1½ hours, then heated to 180° C. and stirred for 24 hours, giving a clear brown liquid. This is intermediate 1.

Example 2

Carbosperse K752 (20.75 parts) and poly(ethylene glycol) methyl ether (MW 750, 13.62 parts) and ortho phosphoric acid (0.24 parts) are charged to a reaction flask and heated, under a nitrogen blanket with a trap fitted, to 120° C. and stirred for 2 hours, then charged the Poly(ethylene glycol-ran-propylene glycol) monobutyl ether (MW 970, 52.83 parts) and heated to 180° C. and stirred for 24 hours, giving a liquid. This is intermediate 2.

Example 3

Carbosperse K752 (151.73 parts) and poly(ethylene glycol) methyl ether (MW 500, 66.38 parts) and poly(ethylene glycol-ran-propylene glycol) monobutyl ether (MW 970, 398.29 parts) are charged to a reaction flask and heated, under a nitrogen blanket with a trap fitted, to 120° C. and stirred for 2 hours, then heated to 140° C. and stirred for 3 hours, then heated to 180° C. and stirred for 24 hours, giving a clear liquid. This is intermediate 3.

Example 4

Carbosperse K752 (27.05 parts) and poly(ethylene glycol) methyl ether (MW 500, 5.92 parts) and poly(ethylene glycol-ran-propylene glycol) monobutyl ether (MW 970, 71.00 parts) are charged to a reaction flask and heated, under a nitrogen blanket with a trap fitted, to 120° C. and stirred for 1 hours, then heated to 140° C. and stirred for 1½ hours, then heated to 180° C. and stirred for 24 hours, giving a cloudy yellow liquid. This is intermediate 4.

Example 5

Carbosperse K752 (51.14 parts) and poly(ethylene glycol) methyl ether (MW 500, 22.38 parts) and ortho phosphoric acid (0.84 parts) are charged to a reaction flask and heated, under a nitrogen blanket with a trap fitted, to 120° C. and stirred for 4 hours, then charged the poly(ethylene glycol-ran-propylene glycol) monobutyl ether (MW 1700, 228.21 parts) and heated to 180° C. and stirred for 24 hours, giving an orange liquid. This is intermediate 5.

Example 6

Carbosperse K752 (11.73 parts) and poly(ethylene glycol) methyl ether (MW 500, 5.13 parts) and Surfonamine B-200 (61.56 parts) are charged to a reaction flask and heated, under a nitrogen blanket with a trap fitted, to 120° C. and stirred for 3 hours, then heated to 140° C. and stirred for 2½ hours, then heated to 160° C. and stirred for 18½ hours, giving a clear orange liquid. This is intermediate 6.

Example 7

Carbosperse K752 (39.66 parts) and poly(ethylene glycol) methyl ether (MW 500, 17.35 parts) and poly(propylene glycol) monobutyl ether (MW 1000, 104.10 parts) are charged to a reaction flask and heated, under a nitrogen blanket with a trap fitted, to 120° C. and stirred for 3 hours, then heated to 140° C. and stirred for 2 hours, then heated to 180° C. and stirred for 30 hours, giving a clear liquid. This is intermediate 7.

Example 8

Carbosperse K732 (21.91 parts) and poly(ethylene glycol) methyl ether (MW 500, 7.61 parts) and poly(ethylene glycol-ran-propylene glycol) monobutyl ether (MW 970, 45.64 parts) are charged to a reaction flask and heated, under a nitrogen blanket with a trap fitted, to 120° C. and stirred for 2 hours, then heated to 140° C. and stirred for 112 hours, then heated to 180° C. and stirred for 24 hours, giving a clear yellow liquid. This is intermediate 8.

Example 9

Poly(acrylic-co-maleic acid) (46.10 parts) and poly(ethylene glycol) methyl ether (MW 500, 18.38 parts) and ortho phosphoric acid (0.45 parts) are charged to a reaction flask and heated, under a nitrogen blanket with a trap fitted, to 150° C. and stirred for 2/2 hours, then charged the poly(ethylene glycol-ran-propylene glycol) monobutyl ether (MW 970, 106.98 parts) and heated to 180° C. and stirred for 30 hours, giving a liquid. This is intermediate 9.

Example 10

Carbosperse K752 (70.55 parts) and poly(ethylene glycol) methyl ether (MW 500, 30.87 parts) and polyether amine (consisting of C12-15 alcohol reacted with propylene oxide (MW 1660), followed by base catalyzed addition of the resultant polyetheralcohol to acrylonitrile and subsequent hydrogenation to give an amine (85% active)) (MW 2000, ex Lubrizol, 450.79 parts) are charged to a reaction flask and heated, under a nitrogen blanket with a trap fitted, to 120° C. and stirred for 2 hours, then heated to 140° C. and stirred for 3 hours, then heated to 160° C. and stirred for 17 hours, then heated to 180° C. and stirred for 24 hours giving a brown liquid. This is intermediate 10.

Example 11

Carbosperse K752 (27.04 parts) and Synperonic A11 (15.97 parts) are charged to a reaction flask and heated, under a nitrogen blanket with a trap fitted, to 120° C. and stirred for 1.5 hours, then heated to 140° C. and stirred for 18 hours, increased the temperature to 160° C. charged warm (70° C.) poly(ethylene glycol-ran-propylene glycol) monobutyl ether (MW 970, 15.89 parts) and stirred for 1 hour charged poly(ethylene glycol-ran-propylene glycol) monobutyl ether (MW 970, 55.09 parts) over half an hour and then stirred the reaction mixture for a further half hour, increased the temperature to 180 C and stirred the for 19 hours giving a clear yellow liquid. This is intermediate 11.

Example 12

Carbosperse K752 (13.32 parts) and polyether amine (consisting of C12-15 alcohol reacted with butylene oxide (MW 1700), followed by base catalyzed addition of the resultant polyetheralcohol to acrylonitrile and subsequent hydrogenation to give an amine (80% active)) (MW 2300, ex Lubrizol, 81.00 parts) are charged to a reaction flask and heated, under a nitrogen blanket with a condenser fitted, to 80° C. and stirred for 2 hours, then exchanged condenser for a trap and heated to 120° C. and stirred for 1 hours, then heated to 140° C. and stirred for 16 hours giving a brown liquid. This is intermediate 12.

Example 13

Carbosperse K752 (11.46 parts) and polyether amine (consisting of C12-15 alcohol reacted with propylene oxide (MW 1660), followed by base catalyzed addition of the resultant polyetheralcohol to acrylonitrile and subsequent hydrogenation to give an amine (85% active)) (MW 2100, ex Lubrizol, 64.64 parts) are charged to a reaction flask and heated, under a nitrogen blanket with a condenser fitted, to 80° C. and stirred for 2.5 hours, then exchanged condenser for a trap and heated to 120° C. and stirred for 16 hours, then heated to 160° C. and stirred for 6 hours giving a brown liquid. This is intermediate 13.

Example 14

Carbosperse K752 (3.67 parts) and Surfonamine B-200 (60.35 parts) are charged to a reaction flask and heated, under a nitrogen blanket with a condenser fitted, to 80° C. and stirred for 1 hour, then exchanged condenser for a trap and heated to 120° C. and stirred for 3.5 hours, then heated to 140° C. and stirred for 2 hours, then heated to 160° C. and stirred for 19 hours giving a brown liquid. This is intermediate 14.

Example 15

Carbosperse K752 (17.45 parts) and poly(ethylene glycol) methyl ether (MW 750, 2.86 parts) and poly(ethylene glycol-ran-propylene glycol) monobutyl ether (MW 970, 45.81 parts) are charged to a reaction flask and heated, under a nitrogen blanket with a condenser fitted, to 80° C. and stirred for 1 hour, then replaced the condenser with a trap and heated to 120° C. and stirred for 2.5 hours, then heated to 140° C. and stirred for 1 hour, then heated to 180° C. and stirred for 17 hour, giving a clear liquid. This is intermediate 15.

Example 16

Carbosperse K752 (44.15 parts) and poly(ethylene glycol) methyl ether (MW 350, 47.32 parts) and Surfonamine B-200 (45.31 parts) are charged to a reaction flask and heated, under a nitrogen blanket with a condenser fitted, to 80° C. and stirred for 2 hour, then replaced the condenser with a trap and heated to 120° C. and stirred for 2 hours, then heated to 140° C. and stirred for 1.5 hours, then heated to 160° C. and stirred for 21 hours, giving a clear liquid. This is intermediate 16.

Example 17

Polyitaconic acid (11.88 parts) is dissolved in isopropyl alcohol (39.25 parts) and distilled water (50 parts) in a reaction flask and heated, under a nitrogen blanket with a condenser fitted, to 70° C. and Surfonamine B-200 (30.25 parts) is charged. This is heated at 70° C. for 2 hours. A trap is added and heated to 110° C. and stirred for 4 hours, then heated to 130° C. and stirred for 3 hours. The trap and condenser are removed and heated to 160° C. and stirred for 16 hours, giving a very viscous brown liquid. This is intermediate 17.

Example 18

Polyitaconic acid (9.37 parts) is dissolved in isopropyl alcohol (39.25 parts) and distilled water (50 parts) in a reaction flask and heated, under a nitrogen blanket with a condenser fitted, to 70° C. and Surfonamine B-200 (47.71 parts) is charged. This is heated at 70° C. for 2 hours. A trap is added and heated to 110° C. and stirred for 3 hours, then heated to 130° C. and stirred for 2.5 hours. The trap and condenser are removed and heated to 160° C. and stirred for 30 hours, giving a viscous brown liquid. This is intermediate 18.

Example 19

Albritect CP 30 (13.93 parts), isopropyl alcohol (39.25 parts), distilled water (50 parts) and Surfonamine B-200 (24.75 parts) are charged to a reaction flask and heated, under a nitrogen blanket with a condenser and a trap fitted, to 100° C. and stirred for 3 hours, then heated to 130° C. and stirred for 2 hours. The trap and condenser are removed and heated at 130° C. for 3 hours. When cool the mixture is dissolved in toluene (27 parts) and heated, with a dean and stark trap containing toluene fitted, to 115° C. and stirred for 3.5 hours, and then heated to 120° C. and stirred for 40 hours giving a clear orange liquid. This is intermediate 19.

Example 20

Carbosperse K-775 (23.04 parts), Surfonamine B-200 (56.90 parts) and isopropyl alcohol (12 parts) are charged to a reaction flask and heated, under a blanket of nitrogen with a condenser fitted, to 50° C. and stirred for 1 hour, then heated to 70° C. and stirred for 1.5 hours. A trap is added and heated to 120° C. and stirred for 3 hours. The trap and condenser are removed and heated at 120° C. and stirred for 17 hours, then heated to 160° C. and stirred for 24 hours, giving a clear orange liquid. This is intermediate 20.

Example 21

Carbosperse K-752 (19.12 parts) and Surfonamine B-200 (120.46 parts) are charged to a reaction flask and heated, under a blanket of nitrogen and a condenser fitted, to 80° C. A trap is added and heated to 130° C. and stirred for 4 hours. The trap and condenser are removed and heated to 150° C. and stirred for 34 hours giving an amber viscous liquid. This is intermediate 21.

Example 22

Surfonamine B-200 (120.46 parts) and isopropyl alcohol (11.10 parts) are charged to a reaction flask and heated, under a blanket of nitrogen and a condenser fitted, to 50° C. Polymethacrylic acid (17.05 parts) is charged slowly and stirred for 0.5 hours at 50° C. before heating to 70° C. and stirring for 1 hour. A trap is added and heated to 120° C. and stirred for 3.5 hours. The trap and condenser are removed and heated to 160° C. and stirred for 16 hours giving a dark brown viscous liquid. This is intermediate 22.

Example 23

Surfonamine B-100 (18.55 parts), Surfonamine L-207 (37.33 parts) and isopropyl alcohol (7.00 parts) are charged to a reaction flask and heated, under a blanket of nitrogen and a condenser fitted, to 50° C. Carbosperse K-752 (10.05 parts) is charged slowly and stirred for 0.5 hours at 50° C. before heating to 70° C. and stirring for 1 hour. A trap is added and heated to 120° C. and stirred for 3.5 hours. The trap and condenser are removed and heated to 160° C. and stirred for 16 hours giving a dark red liquid. This is intermediate 23.

Dispersant Examples

Example 24

Intermediate 1 (25.58 parts) is charged to a reaction flask and heated, under nitrogen, to 120° C., charged preheated (70° C.) Epomin SP-006 (1.97 parts) and stirred for 6 hours, giving an orange gel. This is Dispersant 1 (D1).

Example 25

Intermediate 2 (38.61 parts) and Epomin SP-006 (2.97 parts) and polypropyleneglycol (MW 1000, 41.58 parts) are charged to a reaction flask and heated, under nitrogen, to 70° C. and stirred for 6 hours, giving a liquid. This is Dispersant 2 (D2).

Example 26

Intermediate 3 (45.49 parts) and Epomin SP-006 (3.50 parts) and polypropyleneglycol (MW 1000, 48.99 parts) are charged to a reaction flask and heated, under nitrogen, to 70° C. and stirred for ½ an hour, giving a liquid. This is Dispersant 3 (D3).

Example 27

Intermediate 3 (35.10 parts) and Epomin SP-006 (4.15 parts) and polypropyleneglycol (MW 1000, 39.25 parts) are charged to a reaction flask and heated, under nitrogen, to 70° C. and stirred for 6 hours, giving a liquid. This is Dispersant 4 (D4).

Example 28

Intermediate 3 (51.84 parts) is charged to a reaction flask and heated, under nitrogen, to 120° C., charged preheated (70° C.) Epomin SP-006 (3.99 parts) and stirred for 5 hours, cooled to 70° C. and charged preheated (50° C.) polypropyleneglycol (MW 1000, 55.83 parts) and stirred for 2 hours, giving a clear orange liquid. This is Dispersant 5 (D5).

Example 29

Intermediate 3 (25.58 parts) is charged to a reaction flask and heated, under nitrogen, to 120° C., charged preheated (70° C.) Epomin SP-006 (1.71 parts) and stirred for 5 hours, cooled to 70° C. and charged polypropyleneglycol (MW 1000, 27.29 parts) and stirred for 1 hours, giving a yellow liquid. This is Dispersant 6 (D6).

Example 30

Intermediate 3 (16.55 parts) is charged to a reaction flask and heated, under nitrogen, to 120° C., charged preheated (70° C.) Epomin SP-006 (0.83 parts) and stirred for 5 hours, cooled to 70° C. and charged polypropyleneglycol (MW 1000, 17.38 parts) and stirred for 1 hours, giving a yellow liquid. This is Dispersant 7 (D7).

Example 31

Intermediate 3 (48.36 parts) and Epomin SP-018 (3.72 parts) and polypropyleneglycol (MW 1000, 50.08 parts) are charged to a reaction flask and heated, under nitrogen, to 70° C. and stirred for 6 hours, giving a liquid. This is Dispersant 8 (D8).

Example 32

Intermediate 3 (10.55 parts) and Epomin P-1050 (1.62 parts) and polypropyleneglycol (MW 1000, 11.36 parts) are charged to a reaction flask and heated, under nitrogen, to 120° C. and stirred for 6 hours, giving a clear yellow liquid. This is Dispersant 9 (D9).

Example 33

Intermediate 4 (23.88 parts) is charged to a reaction flask and heated, under nitrogen, to 120° C., charged preheated (70° C.) Epomin SP-006 (1.84 parts) and stirred for 6 hours, giving an orange gel. This is Dispersant 10 (D10).

Example 34

Intermediate 5 (43.58 parts) and Epomin SP-006 (3.35 parts) and polypropyleneglycol (MW 1000, 46.93 parts) are charged to a reaction flask and heated, under nitrogen, to 70° C. and stirred for 6 hours, giving a liquid. This is Dispersant 11 (D11).

Example 35

Intermediate 6 (25.74 parts) is charged to a reaction flask and heated, under nitrogen, to 120° C., charged preheated (70° C.) Epomin SP-006 (1.98 parts) and stirred for 5 hours, giving an orange gel. This is Dispersant 12 (D12).

Example 36

Intermediate 7 (38.37 parts) is charged to a reaction flask and heated, under nitrogen, to 120° C., charged preheated (70° C.) Epomin SP-006 (2.95 parts) and stirred for 6 hours, giving an orange gel. This is Dispersant 13 (D13).

Example 37

Intermediate 8 (22.66 parts) is charged to a reaction flask and heated, under nitrogen, to 120° C., charged preheated (70° C.) Epomin SP-006 (1.74 parts) and stirred for 6 hours, giving an orange gel. This is Dispersant 14 (D14).

Example 38

Intermediate 9 (9.93 parts) and polypropyleneglycol (MW 1000, 10.69 parts) are charged to a reaction flask and heated, under nitrogen, to 120° C., charged preheated (70° C.) Epomin SP-006 (0.76 parts) and stirred for 6 hours, giving a brown clear liquid. This is Dispersant 15 (D15).

Example 39

Intermediate 3 (10.66 parts) and Toluene (11.77 parts) are charged to a reaction flask and heated, under nitrogen with a condenser fitted on the flask, to 70° C., charged preheated (70° C.) Epomin SP-006 (0.89 parts) temperature increased to 111° C. and stirred for 2 hours. Reaction temperature reduced to 70° C. then added Succinic Anhydride (0.22 parts) temperature increased to 111° C. and stirred for 1.5 hours, giving a yellow liquid. This is Dispersant 16 (D16).

Example 40

Intermediate 3 (18.49 parts) and Toluene (20.42 parts) are charged to a reaction flask and heated, under nitrogen with a condenser fitted on the flask, to 70° C., charged preheated (70° C.) Epomin SP-006 (1.54 parts) temperature increased to 111° C. and stirred for 2.5 hours. Reaction temperature reduced to 70° C. then added Dimethyl Sulphate (0.39 parts)

temperature increased to 111° C. and stirred for 2 hours, giving a yellow liquid. This is Dispersant 17 (D17).

Example 41

Intermediate 3 (18.14 parts) and Toluene (21.16 parts) are charged to a reaction flask and heated, under nitrogen with a condenser fitted on the flask, to 70° C., charged preheated (70° C.) Epomin SP-006 (1.51 parts) temperature increased to 111° C. and stirred for 2.5 hours. Reaction temperature reduced to 70° C. then added Example 9 from U.S. Pat. No. 6,051,627 (ex Lubrizol, 1.51 parts) and stirred for 2 hours, giving a yellow liquid. This is Dispersant 18 (D18).

Example 42

Intermediate 3 (310.19 parts) is charged to a reaction flask and heated, under nitrogen, to 120° C., charged preheated (70° C.) Epomin SP-006 (23.92 parts) and stirred for 6 hours. Giving an orange viscous liquid. This is Dispersant 19 (D19).

Example 43

Intermediate 10 (46.94 parts) is charged to a reaction flask and heated, under nitrogen, to 120° C., charged preheated (70° C.) Epomin SP-006 (1.77 parts) and stirred for 6 hours. Giving a dark brown liquid. This is Dispersant 20 (D20).

Example 44

Intermediate 11 (36.12 parts) is charged to a reaction flask and heated, under nitrogen, to 120° C., charged preheated (70° C.) Epomin SP-006 (2.78 parts) and stirred for 6 hours. Giving a clear orange very viscous liquid. This is Dispersant 21 (D21).

Example 45

Intermediate 12 (37.69 parts) is charged to a reaction flask and heated, under nitrogen, to 70° C., charged preheated (70° C.) Epomin SP-006 (2.90 parts) heated to 120° C. and stirred for 6 hours. Giving a viscous liquid. This is Dispersant 22 (D22).

Example 46

Intermediate 13 (21.52 parts) and Toluene (23.18 parts) are charged to a reaction flask and heated, under nitrogen with a condenser fitted, to 80° C., charged preheated (70° C.) Epomin SP-006 (1.66 parts) heated to 111° C. and stirred for 4 hours. Giving a brown liquid. This is Dispersant 23 (D23).

Example 47

Intermediate 14 (21.52 parts) is charged to a reaction flask and heated, under nitrogen, to 70° C., charged preheated (70° C.) Epomin SP-006 (2.53 parts) heated to 120° C. and stirred for 6 hours. Giving a brown viscous liquid. This is Dispersant 24 (D24).

Example 48

Intermediate 15 (22.36 parts) and Toluene (24.08 parts) are charged to a reaction flask and heated, under nitrogen with a condenser fitted on the flask, to 70° C., charged preheated (70° C.) Epomin SP-006 (1.72 parts) temperature increased to 111° C. and stirred for 3 hours, giving an orange liquid. This is Dispersant 25 (D25).

Example 49

Intermediate 16 (33.83 parts) and Toluene (36.43 parts) are charged to a reaction flask and heated, under nitrogen with a condenser fitted on the flask, to 70° C., charged preheated (70° C.) Epomin SP-006 (2.60 parts) temperature increased to 111° C. and stirred for 6 hours, giving viscous liquid. This is Dispersant 26 (D26).

Example 50

Intermediate 3 (40.47 parts) is charged to a reaction flask and heated, under nitrogen, to 70° C., charged Tetraethylenepentamine (2.76 parts) heated to 120° C. and stirred for 5 hours, cooled to 70° C. charged polypropyleneglycol (MW 1000, 43.23 parts) and stirred for 1 hour, giving a liquid. This is Dispersant 27 (D27).

Example 51

Intermediate 3 (30.23 parts) and Toluene (45.35 parts) are charged to a reaction flask and heated, under nitrogen with a condenser fitted on the flask, to 70° C., charged preheated (70° C.) Epomin SP-006 (15.11 parts) temperature increased to 105° C. and stirred for 5 hours, giving a liquid. This is Dispersant 28 (D28).

Example 52

Intermediate 17 (5.24 parts) and toluene (22.56 parts) are charged to a reaction flask and heated, under a blanket of nitrogen with a condenser fitted, to 100° C., charged preheated (70° C.) Epomin SP-006 (0.40 parts) and stirred at 100° C. for 4 hours giving an orange liquid. This is Dispersant 29 (D29).

Example 53

Intermediate 18 (6.43 parts) and toluene (6.93 parts) are charged to a reaction flask and heated, under a blanket of nitrogen with a condenser fitted, to 100° C., charged preheated (70° C.) Epomin SP-006 (0.50 parts) and stirred at 100° C. for 4 hours giving an orange liquid. This is Dispersant 30 (D30).

Example 54

Intermediate 19 (49% active in toluene, 5.24 parts) and toluene (0.18 parts) are charged to a reaction flask and heated, under a blanket of nitrogen with a condenser fitted, to 100° C., charged preheated (70° C.) Epomin SP-006 (0.31 parts) and stirred at 100° C. for 2.5 hours giving a yellow liquid. This is Dispersant 31 (D31).

Example 55

Intermediate 20 (6.71 parts) and toluene (14.46 parts) are charged to a reaction flask and heated, under a blanket of nitrogen with a condenser fitted, to 100° C., charged preheated (70° C.) Epomin SP-006 (0.52 parts) and stirred at 100° C. for 2.5 hours giving an amber liquid. This is Dispersant 32 (D32).

Example 56

Intermediate 21 (4.39 parts) and toluene (4.73 parts) are charged to a reaction flask and heated, under a blanket of nitrogen with a condenser fitted, to 100° C., charged preheated (70° C.) Epomin SP-006 (0.34 parts) and stirred for 6 hours giving an amber liquid. This is Dispersant 33 (D33).

Example 57

Intermediate 21 (6.46 parts) and isopropyl alcohol (6.46 parts) are charged to a reaction flask and heated, under a blanket of nitrogen with a condenser fitted, to 50° C. Polyallylamine (3.31 parts) is charged and stirred at 50° C. for 3 hours. The condenser is removed and the mixture is heated to 70° C. and stirred for 1.5 hours, then heated to 100° C. and stirred for 0.5 hours. Toluene (7 parts) was charged and a dean and stark trap containing toluene was fitted to the flask. The mixture was stirred at 100° C. for 1.5 hours, then heated to 115° C. and stirred for 9.5 hours giving an amber liquid. This is Dispersant 34 (D34).

Example 58

Intermediate 22 (12.47 parts) and toluene (13.50 parts) are charged to a reaction flask and heated, under a blanket of nitrogen with a condenser fitted, to 70° C. and charged preheated (70° C.) Epomin SP-006 (0.96 parts). The temperature is increased to 100° C. and stirred for 3.5 hours giving a dark orange liquid. This is Dispersant 35 (D35).

Example 59

Intermediate 21 (95.05 parts) is charged to a reaction flask and heated, under a blanket of nitrogen with a condenser fitted, to 70° C. and charged preheated (70° C.) Epomin SP-006 (13.58 parts). Toluene (36.15 parts) is also charged and stirred for 0.5 hours. The temperature is increased to 100° C. and stirred for 3 hours giving a brown viscous liquid. This is Dispersant 36 (D36).

Example 60

Intermediate 21 (11.93 parts) is charged to a reaction flask and heated, under a blanket of nitrogen with a condenser fitted, to 50° C. and charged dimethylaminopropylamine (0.16 parts) and stirred for 3 hours. Toluene (13.00 parts) is charged and stirred for 1 hour. Preheated (70° C.) Epomin SP-006 (0.92 parts) is charged and stirred for 2 hours giving a brown liquid. This is Dispersant 37 (D37).

Example 61

Intermediate 22 (12.15 parts) and a polycaprolactone-co-valerolactone polyester (prepared as in Example 19 of U.S. Pat. No. 6,197,877; 1.26 parts) are charged to a reaction flask and heated, under a blanket of nitrogen with a condenser fitted, to 80° C. and stirred for 1 hour. Preheated (70° C.) Epomin SP-006 (1.03 parts). The temperature is increased to 120° C. and stirred for 5 hours giving an extremely viscous yellow liquid. This is Dispersant 38 (D38).

Example 62

Intermediate 21 (109.91 parts) is charged to a reaction flask and heated, under a blanket of nitrogen with a condenser fitted, to 70° C. and charged preheated (70° C.) Epomin SP-006 (7.31 parts) and toluene (39.16 parts). The temperature is increased to 90° C. and stirred for 0.5 and then to 100° C. and stirred for 5 hours giving a brown liquid. This is Dispersant 39 (D39).

Example 63

Dispersant 39 (19.43 parts, 75% active in toluene) is charged to a reaction flask and heated, under a blanket of nitrogen with a condenser fitted, to 80° C. and charged dropwise hydrogen peroxide (0.54 parts) and stirred for 6 hours giving an extremely viscous orange liquid. This is Dispersant 40 (D40).

Example 64

Dispersant 39 (13.71 parts, 75% active in toluene) is charged to a reaction flask and heated, under a blanket of nitrogen with a condenser fitted, to 80° C. and charged dropwise phenyl isocyanate (0.51 parts) and toluene (8.65 parts) and stirred for 4 hours giving a yellow liquid. This is Dispersant 41 (D41).

Example 65

Intermediate 23 (11.55 parts) is charged to a reaction flask and heated, under a blanket of nitrogen with a condenser fitted, to 70° C. and charged preheated (70° C.) Epomin SP-006 (0.89 parts). The temperature is increased to 120° C. and stirred for 2.5 hours giving a viscous brown liquid. This is Dispersant 42 (D42).

Trident Vial Milling Test.

Each dispersant (0.5 parts) is separately dissolved (by warming if necessary) in toluene (7.5 parts), 3 mm glass beads (16 parts) and black pigment (2 parts, Printex 60 ex Evonik) are added. The resulting mixture is milled for 16 hours on a horizontal shaker. The viscosity of the resulting dispersions is then assessed using an arbitrary scale of A to E (A being a very fluid liquid, E being a viscous immobile gel) as shown in Table 1.

If polypropyleneglycol or Toluene is present in the dispersant extra dispersant is used so that 0.5 parts of the active dispersant is still used, and the same amount of Toluene is removed from the system. For example in Dispersant 9 (D9) that contains 50% polypropyleneglycol, 1 part of Dispersant 9 is used and 7 parts of Toluene.

TABLE 1

Trident vial milling test

| Agent | Viscosity rating |
|---|---|
| CEx A | D/E |
| CEx A* | D/E |
| CEx B | E |
| CEx B* | E |
| D1 | B |
| D2 | A |
| D3 | B |
| D4 | A |
| D5 | A |
| D6 | B |
| D7 | D |
| D8 | B |
| D9 | B |
| D10 | B |
| D11 | A |
| D12 | A |
| D13 | A |
| D14 | A |
| D15 | A/B |
| D16 | C/D |
| D17 | B |
| D18 | B |
| D19 | A |
| D20 | A |

TABLE 1-continued

Trident vial milling test

| Agent | Viscosity rating |
|---|---|
| D21 | A |
| D22 | A |
| D23 | A |
| D24 | A |
| D25 | A |
| D26 | B |
| D27 | C |
| D28 | A |
| D29 | A |
| D30 | A |
| D31 | A/B |
| D32 | A |
| D33 | A* |
| D34 | A |
| D35 | A |
| D36 | A |
| D37 | A |
| D38 | A |
| D39 | A |
| D40 | A |
| D41 | A |
| D42 | A |

*Note for these samples an additional 0.5 parts of polypropylene glycol was dissolved in the toluene, and only 7 parts of toluene was used.

Dispersion Evaluation:

Polypropylene glycol (MW 1000, ex Sigma-Aldrich, 69.54 parts) and each example dispersant (7.16 parts of active content, any polypropyleneglycol in the sample from the Example step is not considered active content) are charged to a Dispermat pot and mixed with a saw tooth impellor at 1000 rpm for 30 seconds. Speed set to 800 rpm and Printex 60 (Ex Evonik, 25.56 parts) is charged over 1 minute. Speed set to 1000 rpm for 10 minutes. Saw tooth impellor replaced with three tier impellor 3 mm glass beads (190 parts) are charged. Milled at 3000 rpm for between 30 and 60 minutes until particle size is less than 5 microns, by Hegman Gauge measurement. The resulting slurry is sieved through a 400 micron sieve, giving the test sample.

Each test sample is measured on a TA Instruments AR500 Controlled Stress Rheometer in flow measurement mode, using a 40 mm stainless steel plate with a 250 micron gap. The experiment is a continuous ramp measurement at 25° C. The samples are sheared at rates of 0.1 $s^{-1}$ to 5000 $s^{-1}$. The viscosity data (Pas) obtained is as follows in Table 2.

TABLE 2

Viscocity in TA Instruments AR 500

| Shear rate $s^{-1}$ | Viscosity (Pas) | | | | |
|---|---|---|---|---|---|
| | CEx A | D2 | D4 | D7 | D8 | D11 |
| 0.1 | — | 4.495 | 6.258 | 26.58 | 4.594 | 3.328 |
| 1.0 | — | 6.772 | 7.835 | 52.87 | 5.671 | 2.929 |
| 10 | — | 4.32 | 5.101 | 11.75 | 4.048 | 2.053 |
| 100 | — | 1.972 | 2.043 | 2.839 | 2.058 | 1.063 |
| 1000 | — | 1.372 | 1.273 | 1.719 | 1.628 | 1.378 |

Note:
CEx A would not mill as it was too viscous, this also occurred when twice as much CEx A was used in the test.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative narrower embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A dispersant for use at the interface between an organic medium and a particulate solid, said dispersant comprising a surface active reaction product of a polyether functionalized polyacid reacted with an aminic polybasic species and salts thereof, wherein said polyether functionalized polyacid species comprises a polyacid portion of 10 to 500 repeat units, wherein at least 45 mole % of said repeat units are derived from free radically polymerizable unsaturated monomers with one or more carboxylic acid groups, said polyacid portion comprising at least two free acid groups selected from the types consisting of a carboxylic acid, salt of a carboxylic acid, anhydride of a dicarboxylic acid, acid from phosphorus, and acid from sulfur, and said repeat units being derived from free-radically polymerizing monomers that had contained a polymerizable carbon-to-carbon double bond, wherein said polyether functionalized polyacid comprises two or more polyether segments with an oxygen or aminic group (J) near a terminus of the polyether and connected to said polyacid portion via ester, amide, and/or imide linkages, wherein said two or more polyether segments comprises a polyether segment of the Q' type having the formula -J-$(C_\delta H_{2\delta}$—O$)_T$—$(CH_2CH_2O)_X$—$R_2$ where δ is 3 and/or 4, -J- is —O—, —N(H)—, or >N—, $_T$ is from 4 to 45 total $C_3$ and $C_4$ alkylene oxide repeat units and $_X$ is up to 45 repeat units of ethylene oxide per segment, and $R_2$ is a hydrocarbyl group with up to 36 carbon atoms, and/or a polyether segment of G' type having the formula -J-$(C_\delta H_{2\delta}$—O$)_L$—$(CH_2CH_2O)_M$—$R_1$, where δ is 3 and/or 4, -J- is —O—, —N(H)—, or >N—, $_M$ is from 3 to 60 ethylene oxide units and $_L$ is up to 20 total $C_3$ and $C_4$ alkylene oxide units per segment, and $R_1$ is a hydrocarbyl group with up to 36 carbon atoms, M is greater than L;

wherein the number ratio of said acid groups of said polyacid to carbonyl groups in the form of an ester, amide or imide type functionalized with G' type polyether segments to carbonyl in the form of an ester, amide, or imide type functionalized with Q' type polyether segments is 20-90:0-35:5-80 wherein the amount of Q' is further defined as the sum of variables $Q_a'+Q_b'$ where $Q_a'$ is the portion of Q where J is —N(H)— or >N— and $Q_b'$ is the portion of Q' where J is —O—; with the provisions that a) the sum of G'+$Q_a'$ is at least 2.5, and b) $Q_a'+Q_b'$+G' is at least 10;

wherein said aminic polybasic species comprises a polyamine that is linear or branched having a molecular weight from about 140 to 100,000 g/mole;

wherein said reaction product includes two or more ionic and/or covalent bonds between said polyether functionalized polyacid and said aminic polybasic species and the weight ratio of the polyether functionalized polyacid to the aminic polybasic species is from 1:1 to 35:1.

2. The dispersant according to claim 1, wherein said polyether segments have a terminal group $R_1$ and $R_2$ comprising a $C_{1-18}$ linear, branched, or cyclic alkyl; aryl; alkylaryl; or arylalkyl terminus.

3. The dispersant according to claim 1, wherein the ratio of acid groups to carbonyl groups functionalized with G' type polyether segments to carbonyl groups functionalized with Q' type polyether segments is from 60-90:0-35:5-40.

4. The dispersant according to claim 1, wherein the polyether segment of the G' type has from 5 to 25 ethylene oxide repeat units and up to 5 total $C_3$ and $C_4$ alkylene oxide repeat units per segment and said polyether segment of the Q' type has 5-30 of those units of total $C_3$ and $C_4$ alkylene oxide and no more than 40 repeat units of ethylene oxide per polyether segment.

5. The dispersant according to claim 1, wherein said polyacid portion of said polyether functionalized polyacid has from 10 to 200 of said repeat units containing an acid group.

6. The dispersant according to claim 1, wherein said polybasic aminic species comprises a polyallylamine or polyethyleneimine having a molecular weight from about 140 to about 75,000 g/mole, and said polyacid portion of said polyether functionalized polyacid optionally comprises up to 5 mole % based on the polyacid of repeat units from free radically polymerizable monomers without acid groups, said acid groups selected from the group consisting of carboxylic acid groups, acid groups from sulfur, and acid groups from phosphorus.

7. A composition comprising the dispersant according to claim 1 and an organic continuous medium which comprises at least 20% by weight of a polyol having two or more hydroxyl functional groups and molecular weight of between 200 and 5000 g/mole.

8. A dispersion comprising the dispersant according to claim 1, and organic continuous medium and a dispersed particulate matter.

9. The dispersion according to claim 8, wherein said organic continuous medium comprises at least 20% by weight based on the weight of said medium of a polyurethane of number average molecular weight of at least 5000 g/mole, said polyurethane comprising repeat units derived from reacting one or more polyisocyanates with at least one macromolecule selected from group consisting of polyether, polyester, and polycarbonate macromolecules.

10. The dispersion according to claim 8, wherein said dispersed particulate is a pigment and said dispersion is used as a color concentrate or a mill-base and optionally wherein the pigment is present at a concentration of at least 10% by weight based on the weight of said reaction product and said organic continuous medium.

11. An ink or coating composition comprising the dispersion according to claim 8.

12. The dispersant formulated into a dispersion according to claim 8, wherein said organic continuous medium comprises a thermosetting resin or a melt processable thermoplastic resin.

* * * * *